US012654585B2

(12) United States Patent
Koga et al.

(10) Patent No.: US 12,654,585 B2
(45) Date of Patent: *Jun. 16, 2026

(54) BATTERY PLACEMENT FOR ELECTRIFIED VEHICLE

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Byron, MN (US); Zachary L. Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Nader Nasr, Neenah, WI (US); Chad K. Smith, Omro, WI (US); John T. Kellander, Oronoco, MN (US); Cody D. Clifton, Mapleton, MN (US); Skylar A. Wachter, Dodge Center, MN (US); Neil Dekarske, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 591 days.

This patent is subject to a terminal disclaimer.

(21) Appl. No.: 18/116,700

(22) Filed: Mar. 2, 2023

(65) Prior Publication Data

US 2023/0202340 A1     Jun. 29, 2023

Related U.S. Application Data

(63) Continuation of application No. 17/972,056, filed on Oct. 24, 2022, now Pat. No. 11,618,339, which is a (Continued)

(51) Int. Cl.
B60L 53/80          (2019.01)
B60L 50/60          (2019.01)
(Continued)

(52) U.S. Cl.
CPC ............... B60L 53/80 (2019.02); B60L 50/64 (2019.02); B60L 50/66 (2019.02); B65F 3/00 (2013.01)

(58) Field of Classification Search
CPC .......... B60L 53/80; B60L 50/64; B60L 50/66; B60K 1/04; B60K 2001/0438
See application file for complete search history.

(56) References Cited

U.S. PATENT DOCUMENTS 3,089,813 A     5/1963  Ellsworth
3,817,415 A     6/1974  Lewis
(Continued)

FOREIGN PATENT DOCUMENTS

CN      201530302  U     7/2010
CN      105644639  A     6/2016
(Continued)

OTHER PUBLICATIONS

Translation of DE-102017009176-A1 (Year: 2018).*
Translation of CN-107264253-A (Year: 2017).*

*Primary Examiner* — Katy M Ebner
(74) *Attorney, Agent, or Firm* — Foley & Lardner LLP

(57)          ABSTRACT

An electrified vehicle includes a chassis and a plurality of battery cells positioned along the chassis. The chassis includes a right frame member and a left frame member. Each of the right frame member and the left frame member has a vertical portion, a first end portion extending from a first end of the vertical portion, and a second end portion extending from an opposing second end of the vertical portion. The right frame member and the left frame member (Continued)

are configured to support a cab and a body. The right frame member and the left frame member extend lengthwise in a longitudinal direction. The plurality of battery cells are supported by at least one of the right frame member or the left frame member via couplings positioned along the vertical portion of the at least one of the right frame member or the left frame member.

15 Claims, 23 Drawing Sheets

Related U.S. Application Data continuation of application No. 17/362,601, filed on Jun. 29, 2021, now Pat. No. 11,505,084, which is a continuation-in-part of application No. 17/007,622, filed on Aug. 31, 2020, now Pat. No. 11,148,550, which is a continuation of application No. 16/851,149, filed on Apr. 17, 2020, now Pat. No. 12,337,718.

(60) Provisional application No. 63/084,334, filed on Sep. 28, 2020, provisional application No. 62/842,934, filed on May 3, 2019.

(51) Int. Cl.
     B60L 50/64          (2019.01)
     B65F 3/00           (2006.01)

(56)                References Cited

U.S. PATENT DOCUMENTS

| | | | |
|---|---|---|---|
| 4,248,323 A | 2/1981 | Gaffney | |
| 4,861,088 A | 8/1989 | Fedrigo | |
| 5,171,121 A | 12/1992 | Smith et al. | |
| 5,697,741 A | 12/1997 | Harris et al. | |
| 5,779,300 A | 7/1998 | Mcneilus et al. | |
| 5,829,946 A | 11/1998 | Mcneilus et al. | |
| 5,919,027 A | 7/1999 | Christenson | |
| 5,931,628 A | 8/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,984,609 A | 11/1999 | Bartlett | |
| 6,033,176 A | 3/2000 | Bartlett | |
| 6,062,803 A | 5/2000 | Christenson | |
| 6,089,813 A | 7/2000 | Mcneilus et al. | |
| 6,120,235 A | 9/2000 | Humphries et al. | |
| 6,123,500 A | 9/2000 | Mcneilus et al. | |
| 6,137,419 A | 10/2000 | Lennox et al. | |
| 6,210,094 B1 | 4/2001 | Mcneilus et al. | |
| 6,213,706 B1 | 4/2001 | Christenson | |
| 6,224,318 B1 | 5/2001 | Mcneilus et al. | |
| 6,247,713 B1 | 6/2001 | Konop | |
| 6,290,450 B1 | 9/2001 | Humphries et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,447,239 B2 | 9/2002 | Young et al. | |
| 6,474,928 B1 | 11/2002 | Christenson | |
| 6,478,317 B2 | 11/2002 | Konop | |
| 6,485,079 B1 | 11/2002 | Brown et al. | |
| 6,527,495 B2 | 3/2003 | Humphries et al. | |
| 6,565,305 B2 | 5/2003 | Schrafel | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,021,689 B1 | 4/2006 | Weisbeck | |
| 7,055,880 B2 | 6/2006 | Archer | |
| 7,070,382 B2 | 7/2006 | Pruteanu et al. | |
| 7,073,847 B2 | 7/2006 | Morrow et al. | |
| 7,111,858 B2 | 9/2006 | Manser et al. | |
| 7,118,314 B2 | 10/2006 | Zhou et al. | |
| 7,140,461 B2 | 11/2006 | Morrow | |
| 7,198,130 B2 | 4/2007 | Schimke | |
| 7,226,080 B2 | 6/2007 | Humphries | |
| 7,264,305 B2 | 9/2007 | Kuriakose | |
| 7,270,346 B2 | 9/2007 | Rowe et al. | |
| 7,284,943 B2 | 10/2007 | Pruteanu et al. | |
| 7,302,320 B2 | 11/2007 | Nasr et al. | |
| 7,357,203 B2 | 4/2008 | Morrow et al. | |
| 7,370,904 B2 | 5/2008 | Wood et al. | |
| 7,379,797 B2 | 5/2008 | Nasr et al. | |
| 7,419,021 B2 | 9/2008 | Morrow et al. | |
| 7,448,460 B2 | 11/2008 | Morrow et al. | |
| 7,517,005 B2 | 4/2009 | Kuriakose | |
| 7,520,354 B2 | 4/2009 | Morrow et al. | |
| 7,521,814 B2 | 4/2009 | Nasr | |
| 7,556,468 B2 | 7/2009 | Grata | |
| 7,559,735 B2 | 7/2009 | Pruteanu et al. | |
| 7,621,580 B2 | 11/2009 | Randjelovic et al. | |
| 7,823,948 B2 | 11/2010 | Redman et al. | |
| 7,848,857 B2 | 12/2010 | Nasr et al. | |
| 7,878,750 B2 | 2/2011 | Zhou et al. | |
| 7,901,215 B1 | 3/2011 | Galgoci et al. | |
| 7,931,103 B2 | 4/2011 | Morrow et al. | |
| 7,937,194 B2 | 5/2011 | Nasr et al. | |
| 7,954,882 B2 | 6/2011 | Brummel et al. | |
| 8,000,850 B2 | 8/2011 | Nasr et al. | |
| 8,152,216 B2 | 4/2012 | Howell et al. | |
| 8,182,194 B2 | 5/2012 | Pruteanu et al. | |
| 8,337,352 B2 | 12/2012 | Morrow et al. | |
| 8,360,706 B2 | 1/2013 | Addleman et al. | |
| 8,376,439 B2 | 2/2013 | Kuriakose et al. | |
| 8,397,853 B2 | 3/2013 | Stefani et al. | |
| 8,540,475 B2 | 9/2013 | Kuriakose et al. | |
| 8,552,852 B1 | 10/2013 | Hertz et al. | |
| 8,561,735 B2 | 10/2013 | Morrow et al. | |
| 8,616,319 B2 | 12/2013 | Yokoyama et al. | |
| 8,789,635 B2 | 7/2014 | Franzen et al. | |
| 8,794,886 B1 | 8/2014 | Nett et al. | |
| 8,807,613 B2 | 8/2014 | Howell et al. | |
| 8,864,613 B2 | 10/2014 | Morrow et al. | |
| 8,936,124 B2 | 1/2015 | Auer et al. | |
| 8,967,699 B1 | 3/2015 | Richmond et al. | |
| 9,061,712 B2 | 6/2015 | Patberg et al. | |
| 9,114,804 B1 | 8/2015 | Shukla et al. | |
| 9,114,930 B2 | 8/2015 | Simmons | |
| 9,132,736 B1 | 9/2015 | Shukla et al. | |
| 9,174,686 B1 | 11/2015 | Messina et al. | |
| 9,216,856 B2 | 12/2015 | Howell et al. | |
| 9,328,986 B1 | 5/2016 | Pennau et al. | |
| 9,366,507 B1 | 6/2016 | Richmond et al. | |
| 9,376,102 B1 | 6/2016 | Shukla et al. | |
| 9,387,985 B2 | 7/2016 | Gillmore et al. | |
| 9,428,042 B2 | 8/2016 | Morrow et al. | |
| 9,452,750 B2 | 9/2016 | Shukla et al. | |
| 9,493,093 B2 | 11/2016 | Stingle et al. | |
| 9,494,170 B2 | 11/2016 | Hou | |
| 9,533,569 B2 | 1/2017 | Mckinney | |
| 9,579,969 B2 | 2/2017 | Crist et al. | |
| 9,598,235 B2 | 3/2017 | Vasilescu et al. | |
| 9,630,483 B2 | 4/2017 | Yamada et al. | |
| 9,649,969 B1 | 5/2017 | Leurck et al. | |
| 9,694,671 B2 | 7/2017 | Wildgrube et al. | |
| 9,694,776 B2 | 7/2017 | Nelson et al. | |
| 9,707,869 B1 | 7/2017 | Messina et al. | |
| 9,731,594 B2 | 8/2017 | Wildgrube | |
| 9,738,186 B2 | 8/2017 | Krueger et al. | |
| 9,821,789 B2 | 11/2017 | Shukla et al. | |
| 9,880,581 B2 | 1/2018 | Kuriakose et al. | |
| 9,956,860 B2 | 5/2018 | Tsuji | |
| 9,981,803 B2 | 5/2018 | Davis et al. | |
| 10,021,467 B1 | 7/2018 | Dunbar | |
| 10,029,556 B2 | 7/2018 | Morrow et al. | |
| 10,035,648 B2 | 7/2018 | Haddick et al. | |
| 10,099,622 B2 | 10/2018 | Handschke et al. | |
| 10,106,032 B2 | 10/2018 | Crist et al. | |
| 10,166,883 B2 | 1/2019 | Brendecke et al. | |
| 10,196,205 B2 | 2/2019 | Betz et al. | |

(56)  References Cited

U.S. PATENT DOCUMENTS

| | | |
|---|---|---|
| 10,315,643 B2 | 6/2019 | Shukla et al. |
| 10,351,340 B2 | 7/2019 | Haddick et al. |
| 10,392,000 B2 | 8/2019 | Shukla et al. |
| 10,414,067 B2 | 9/2019 | Datema et al. |
| 10,414,266 B1 | 9/2019 | Wiegand et al. |
| 10,421,345 B2 * | 9/2019 | Kerspe .................... B60P 3/20 |
| 10,434,949 B2 | 10/2019 | Handschke et al. |
| 10,456,610 B1 | 10/2019 | Betz et al. |
| 10,457,134 B2 | 10/2019 | Morrow et al. |
| 10,457,533 B2 | 10/2019 | Puszkiewicz et al. |
| D869,332 S | 12/2019 | Gander et al. |
| 10,493,837 B1 * | 12/2019 | Angelo ................... B60L 50/66 |
| 10,500,975 B1 | 12/2019 | Healy |
| 10,513,392 B2 | 12/2019 | Haddick et al. |
| 10,545,010 B1 | 1/2020 | Leeman et al. |
| 10,556,539 B1 | 2/2020 | Brown |
| 10,556,622 B1 | 2/2020 | Calliari et al. |
| 10,558,234 B2 | 2/2020 | Kuriakose et al. |
| 10,589,788 B1 | 3/2020 | Milton et al. |
| 10,611,416 B1 | 4/2020 | Groteleuschen et al. |
| 10,618,405 B2 | 4/2020 | Crist et al. |
| 10,688,856 B2 | 6/2020 | Kasai et al. |
| 10,781,090 B2 | 9/2020 | Puszkiewicz et al. |
| 10,800,605 B2 | 10/2020 | Rocholl et al. |
| 10,843,379 B2 | 11/2020 | Rocholl et al. |
| 10,843,549 B2 | 11/2020 | Morrow et al. |
| 10,858,184 B2 | 12/2020 | Betz et al. |
| 10,858,231 B2 | 12/2020 | Holmes et al. |
| 10,859,167 B2 | 12/2020 | Jax et al. |
| 10,899,538 B2 | 1/2021 | Nelson et al. |
| 10,901,409 B2 | 1/2021 | Datema et al. |
| 10,913,346 B2 | 2/2021 | Wiegand et al. |
| 10,940,610 B2 | 3/2021 | Clifton et al. |
| 10,994,929 B2 | 5/2021 | Haddick et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,020,621 B2 | 6/2021 | Betz et al. |
| 11,021,078 B2 | 6/2021 | Rocholl et al. |
| 11,040,610 B2 * | 6/2021 | Sloan ...................... B60L 50/66 |
| 11,042,745 B2 | 6/2021 | Wildgrube et al. |
| 11,042,750 B2 | 6/2021 | Wildgrube et al. |
| 11,046,329 B2 | 6/2021 | Clifton et al. |
| 11,052,899 B2 | 7/2021 | Shukla et al. |
| 11,059,436 B2 | 7/2021 | Wildgrube et al. |
| 11,110,977 B2 | 9/2021 | Smith et al. |
| 11,148,550 B2 | 10/2021 | Rocholl et al. |
| 11,858,373 B2 | 1/2024 | Rocholl et al. |
| 12,227,220 B1 | 2/2025 | Luken et al. |
| 2002/0025245 A1 | 2/2002 | Humphries et al. |
| 2002/0159870 A1 | 10/2002 | Pruteanu et al. |
| 2003/0047956 A1 | 3/2003 | Schrafel |
| 2003/0230412 A1 | 12/2003 | Archer |
| 2003/0231944 A1 | 12/2003 | Weller et al. |
| 2004/0071537 A1 | 4/2004 | Pruteanu et al. |
| 2004/0156706 A1 | 8/2004 | Weller et al. |
| 2004/0165977 A1 | 8/2004 | Hecker |
| 2004/0228699 A1 | 11/2004 | Venton-Walters et al. |
| 2006/0039771 A1 | 2/2006 | Zhou |
| 2006/0045700 A1 | 3/2006 | Siebers et al. |
| 2006/0055206 A1 | 3/2006 | Morrow et al. |
| 2006/0087152 A1 | 4/2006 | Kuriakose |
| 2007/0138817 A1 | 6/2007 | Calliari et al. |
| 2007/0154294 A1 | 7/2007 | Shim et al. |
| 2007/0222253 A1 | 9/2007 | Wood et al. |
| 2007/0296248 A1 | 12/2007 | Kuriakose |
| 2008/0012280 A1 | 1/2008 | Humphries |
| 2008/0036232 A1 | 2/2008 | Randjelovic et al. |
| 2008/0038106 A1 | 2/2008 | Spain |
| 2008/0054667 A1 | 3/2008 | Ohly |
| 2008/0100084 A1 | 5/2008 | Ohly |
| 2008/0100085 A1 | 5/2008 | Ohly |
| 2008/0129068 A1 | 6/2008 | Brummel et al. |
| 2008/0150350 A1 | 6/2008 | Morrow et al. |
| 2008/0237285 A1 | 10/2008 | Calliari |
| 2008/0284188 A1 | 11/2008 | Redman et al. |
| 2009/0194347 A1 | 8/2009 | Morrow et al. |
| 2010/0052357 A1 | 3/2010 | Howell et al. |
| 2010/0166531 A1 | 7/2010 | Bauer et al. |
| 2010/0320012 A1 | 12/2010 | Stappen et al. |
| 2011/0121600 A1 | 5/2011 | Cimrman et al. |
| 2011/0233952 A1 | 9/2011 | Kuriakose et al. |
| 2012/0111654 A1 | 5/2012 | Origuchi |
| 2012/0282077 A1 | 11/2012 | Alberts et al. |
| 2013/0037337 A1 | 2/2013 | Auer et al. |
| 2013/0037338 A1 | 2/2013 | Harunari |
| 2013/0199863 A1 | 8/2013 | Robbins |
| 2013/0327583 A1 | 12/2013 | Nitawaki et al. |
| 2014/0367954 A1 | 12/2014 | McKinney |
| 2015/0043231 A1 | 2/2015 | Clark |
| 2015/0059598 A1 | 3/2015 | Philipp et al. |
| 2015/0151651 A1 | 6/2015 | Stingle et al. |
| 2015/0239372 A1 | 8/2015 | Bauer |
| 2015/0251539 A1 | 9/2015 | Sura et al. |
| 2015/0353150 A1 | 12/2015 | Ursich et al. |
| 2015/0361710 A1 | 12/2015 | Hansen |
| 2016/0185243 A1 | 6/2016 | Zhou et al. |
| 2016/0276638 A1 | 9/2016 | Sham |
| 2016/0375805 A1 | 12/2016 | Krueger et al. |
| 2017/0129386 A1 | 5/2017 | Anderson |
| 2017/0158070 A1 | 6/2017 | Salasoo |
| 2017/0341860 A1 | 11/2017 | Dodds et al. |
| 2017/0361491 A1 | 12/2017 | Datema et al. |
| 2018/0056769 A1 | 3/2018 | Kerspe et al. |
| 2018/0250847 A1 | 9/2018 | Wurtz et al. |
| 2018/0265289 A1 | 9/2018 | Davis et al. |
| 2018/0287287 A1 | 10/2018 | Buttolo et al. |
| 2019/0039407 A1 | 2/2019 | Smith |
| 2019/0077254 A1 | 3/2019 | Stanley |
| 2019/0081298 A1 | 3/2019 | Matecki et al. |
| 2019/0091890 A1 | 3/2019 | Rocholl et al. |
| 2019/0121353 A1 | 4/2019 | Datema et al. |
| 2019/0185077 A1 | 6/2019 | Smith et al. |
| 2019/0193934 A1 | 6/2019 | Rocholl et al. |
| 2019/0202312 A1 | 7/2019 | Aufdencamp |
| 2019/0291559 A1 | 9/2019 | Trenne et al. |
| 2019/0291560 A1 | 9/2019 | Lampsa et al. |
| 2019/0291711 A1 | 9/2019 | Shukla et al. |
| 2019/0292975 A1 | 9/2019 | Hou et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0360600 A1 | 11/2019 | Jax et al. |
| 2020/0078986 A1 | 3/2020 | Clifton et al. |
| 2020/0083573 A1 | 3/2020 | Caliskan et al. |
| 2020/0096953 A1 | 3/2020 | Stalker et al. |
| 2020/0139804 A1 | 5/2020 | Holmes et al. |
| 2020/0148073 A1 | 5/2020 | Sasu |
| 2020/0158474 A1 | 5/2020 | Leeman et al. |
| 2020/0164760 A1 | 5/2020 | Sohmshetty et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0247486 A1 | 8/2020 | Groteleuschen et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0321573 A1 | 10/2020 | Confer |
| 2020/0335840 A1 | 10/2020 | Sloan et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |

(56) References Cited

U.S. PATENT DOCUMENTS

| | | | |
|---|---|---|---|
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0348681 A1 | 11/2020 | Clifton et al. | |
| 2020/0348764 A1 | 11/2020 | Clifton et al. | |
| 2020/0358150 A1 | 11/2020 | Fields et al. | |
| 2020/0369334 A1 | 11/2020 | Lee | |
| 2020/0376977 A1 | 12/2020 | Lee et al. | |
| 2020/0398628 A1 | 12/2020 | Schardt et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0399057 A1 | 12/2020 | Rocholl et al. | |
| 2020/0399058 A1 | 12/2020 | Rocholl et al. | |
| 2020/0402325 A1 | 12/2020 | Koga et al. | |
| 2021/0002112 A1 | 1/2021 | Puszkiewicz et al. | |
| 2021/0031611 A1 | 2/2021 | Yakes et al. | |
| 2021/0031612 A1 | 2/2021 | Yakes et al. | |
| 2021/0031649 A1 | 2/2021 | Messina et al. | |
| 2021/0039719 A1 | 2/2021 | Datema et al. | |
| 2021/0054942 A1 | 2/2021 | Jax et al. | |
| 2021/0069934 A1 | 3/2021 | Rocholl et al. | |
| 2021/0086991 A1 | 3/2021 | Betz et al. | |
| 2021/0122229 A1 | 4/2021 | Wiegand et al. | |
| 2021/0124347 A1 | 4/2021 | Datema et al. | |
| 2021/0139237 A1 | 5/2021 | Nelson et al. | |
| 2021/0143663 A1 | 5/2021 | Bolton | |
| 2021/0155224 A1 | 5/2021 | Mckibben et al. | |
| 2021/0162630 A1 | 6/2021 | Clifton et al. | |
| 2021/0188069 A1 | 6/2021 | Friedman | |
| 2021/0188076 A1 | 6/2021 | Morrow et al. | |
| 2021/0214156 A1 | 7/2021 | Haddick et al. | |
| 2021/0218101 A1 | 7/2021 | Menon et al. | |
| 2021/0221216 A1 | 7/2021 | Yakes et al. | |
| 2021/0225095 A1 | 7/2021 | Koga et al. | |
| 2021/0229755 A1 | 7/2021 | Schwartz et al. | |
| 2021/0229908 A1 | 7/2021 | Rocholl et al. | |
| 2021/0339648 A1 | 11/2021 | Koga et al. | |
| 2021/0362579 A1 | 11/2021 | Kumagai | |
| 2022/0111716 A1 | 4/2022 | Mckibben et al. | |
| 2022/0169252 A1 | 6/2022 | Yhr | |
| 2022/0194489 A1 | 6/2022 | Roche et al. | |
| 2022/0220792 A1 | 7/2022 | Schalyo | |
| 2022/0297771 A1 | 9/2022 | Ozog et al. | |
| 2022/0348113 A1 | 11/2022 | Delrieu et al. | |
| 2023/0113964 A1 | 4/2023 | Norris et al. | |
| 2023/0264766 A1 | 8/2023 | Woods et al. | |
| 2023/0286448 A1 | 9/2023 | Rumph | |
| 2024/0039314 A1 | 2/2024 | Grider et al. | |
| 2024/0140267 A1 | 5/2024 | Dicke et al. | |
| 2024/0140337 A1 | 5/2024 | Dicke et al. | |
| 2024/0383367 A1 | 11/2024 | Vladimerou | |
| 2025/0042236 A1 | 2/2025 | Maroney et al. | |

FOREIGN PATENT DOCUMENTS

| | | | | | |
|---|---|---|---|---|---|
| CN | 106275084 A | * | 1/2017 | ............... | B60K 1/04 |
| CN | 106515413 A | | 3/2017 | | |
| CN | 107264253 A | * | 10/2017 | ............... | B60R 1/00 |
| CN | 107825950 A | | 8/2018 | | |
| CN | 109203960 A | | 1/2019 | | |
| DE | 10 2012 007 875 A1 | | 10/2013 | | |
| DE | 20 2016 006 076 U1 | | 12/2016 | | |
| DE | 102017009176 A1 | * | 4/2018 | ........... | B60K 15/067 |
| EP | 3 330 115 A2 | | 6/2018 | | |
| FR | 3043600 A1 | | 11/2018 | | |
| GB | 2 492 148 A | | 12/2012 | | |
| SE | 540243 C2 | * | 5/2018 | ........... | B60K 15/067 |
| WO | WO-2012/067506 A1 | | 5/2012 | | |
| WO | WO-2014/161557 A1 | | 10/2014 | | |
| WO | WO-2017/064582 A1 | | 4/2017 | | |
| WO | WO-2017/162787 A1 | | 9/2017 | | |
| WO | WO-2018/210363 A1 | | 11/2018 | | |
| WO | WO-2019208749 A1 | * | 10/2019 | ........... | H01M 50/249 |
| WO | WO-2020090171 A1 | * | 5/2020 | ............. | B60K 25/00 |
| WO | WO-2020247573 A1 | * | 12/2020 | ........... | H01M 50/249 |

\* cited by examiner

BATTERY PLACEMENT FOR ELECTRIFIED VEHICLE

CROSS-REFERENCE TO RELATED PATENT APPLICATIONS

This application is a continuation of U.S. patent application Ser. No. 17/972,056, filed Oct. 24, 2022, which is a continuation of U.S. patent application Ser. No. 17/362,601, filed Jun. 29, 2021, which (a) claims the benefit of and priority to U.S. Provisional Patent Application No. 63/084,334, filed Sep. 28, 2020, and (b) is a continuation-in-part of U.S. patent application Ser. No. 17/007,622, filed Aug. 31, 2020, which is a continuation of U.S. patent application Ser. No. 16/851,149, filed Apr. 17, 2020, which claims the benefit of and priority to U.S. Provisional Patent Application No. 62/842,934, filed May 3, 2019, all of which are incorporated by reference herein in their entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to an electrified vehicle. The electrified vehicle includes a chassis and a plurality of battery cells positioned along the chassis. The chassis includes a right frame member and a left frame member. Each of the right frame member and the left frame member has a vertical portion, a first end portion extending from a first end of the vertical portion, and a second end portion extending from an opposing second end of the vertical portion. The right frame member and the left frame member are configured to support a cab and a body. The right frame member and the left frame member extend lengthwise in a longitudinal direction. The plurality of battery cells are supported by at least one of the right frame member or the left frame member via couplings positioned along the vertical portion of the at least one of the right frame member or the left frame member.

Another embodiment relates to an electrified vehicle. The electrified vehicle includes a chassis, an electric motor coupled to the chassis, and a battery pack electrically coupled to the electric motor. The chassis includes a right frame member and a left frame member spaced from the right frame member. The right frame member and the left frame member each have a vertical portion and flanges at opposite ends of the vertical portion. The battery pack is supported by the chassis with one or more couplings that (a) are positioned along at least one of the right frame member or the left frame member and (b) engage with the at least one of the right frame member or the left frame member vertically between the opposite ends of the vertical portion thereof. An uppermost periphery of the battery pack is spaced a distance below an uppermost surface of the at least one of the right frame member or the left frame member.

Another embodiment relates to an electrified vehicle. The electrified vehicle includes a chassis defining an longitudinal axis, a front axle coupled to the chassis, a rear axle coupled to the chassis, a plurality of battery packs including a first battery pack, a second battery pack, and a third battery pack, and an electric motor coupled to the chassis and electrically coupled to at least one of the plurality of battery packs. The chassis includes a right frame member and a left frame member spaced from the right frame member. The right frame member and the left frame member each have a medial portion, a first flange at an upper end of the medial portion, and a second flange at a lower end of the medial portion. The first battery pack and the second battery pack are supported by the right frame member and the left frame member forward of the rear axle by couplings at the medial portion of the right frame member and the left frame member. The third battery pack is positioned rearward of the rear axle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a battery pod assembly for a refuse vehicle is disclosed herein. The battery pod assembly of the present disclosure provides many advantages over conventional systems. The battery pod assembly may include various stress mitigation devices to mitigate mechanical stress (e.g., tensile stress, compressive stress, shear stress, cyclic stress, etc.), thermal stress (e.g., thermal cycling, thermal events, etc.), and/or physical ingress (e.g., water ingress, debris ingress, chemical ingress, etc.) on the battery pod assembly and components thereof.

According to various exemplary embodiments, the battery pod assembly may be positioned in various locations on the refuse vehicle such that the battery pod assembly is readily accessible for regular maintenance. Additionally, components of the battery pod assembly may be modular such that the components can be swapped out or upgraded. For example, a battery cell may be upgraded to future battery cell chemistries not yet available.

According to various exemplary embodiments, the refuse vehicle includes batteries positioned in a longitudinal direction between chassis frame rails of the refuse vehicle, between body frame rails of the refuse vehicle, or between both the chassis frame rails of the refuse vehicle and the body frame rails of the refuse vehicle. The batteries can be the battery pod assembly and may include housings. The batteries may be stacked in a lateral or vertical direction and positioned between the chassis frame rails, between the body frame rails, or between both the chassis and the body frame rails. The chassis frame rails and the body frame rails define a space within which the batteries can be positioned. The batteries can be fastened or coupled with the body frame rails and/or the chassis frame rails depending on configuration and positioning. The batteries can be hung from an underside of the body of the refuse vehicle.

Figure 1:
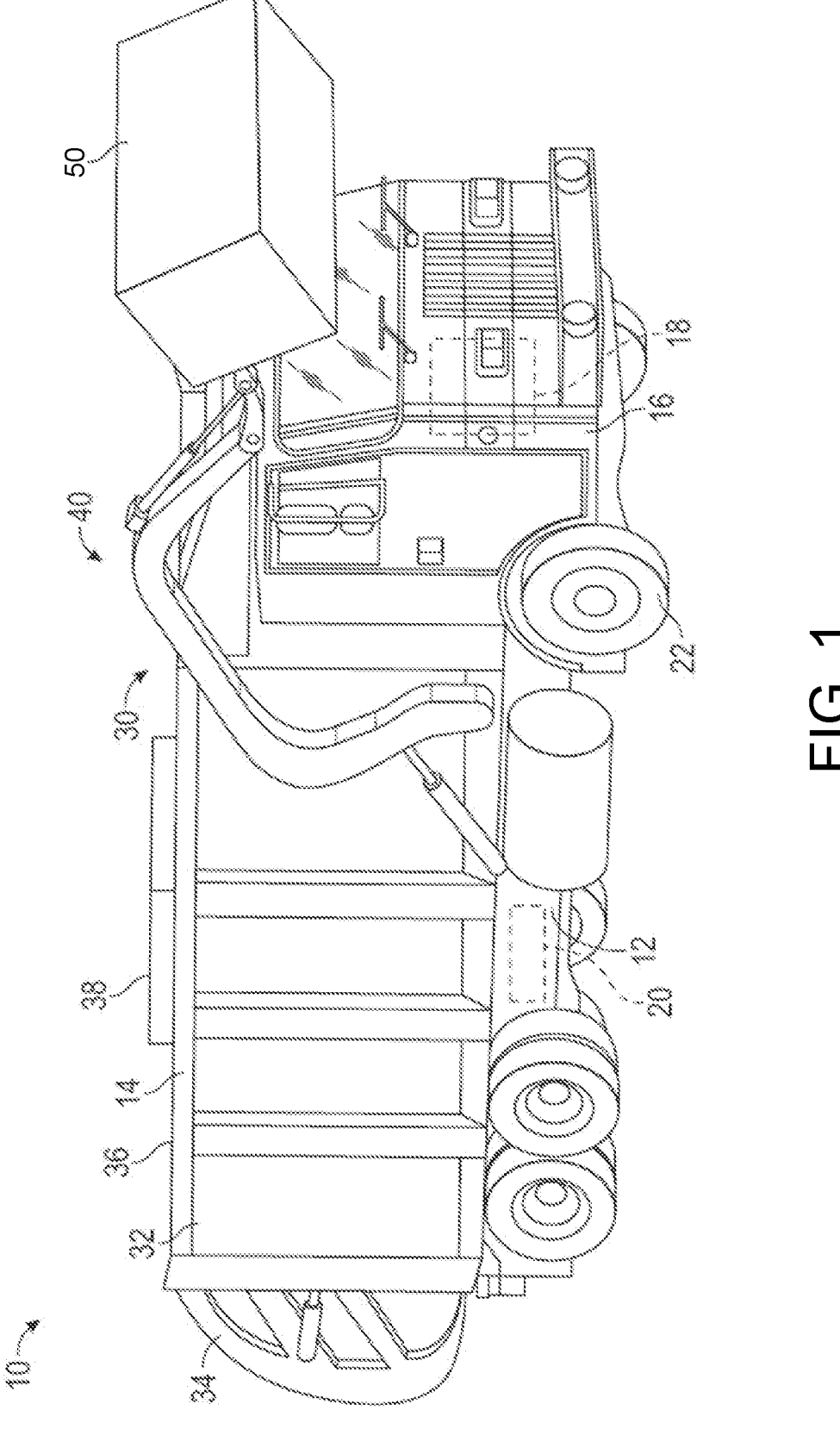
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.) forward of the body 14. The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as a battery pod assembly 20. In other embodiments, the prime mover is or includes an internal combustion engine (e.g., a hybrid engine, etc.). According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the battery pod assembly 20 is coupled to the frame 12 beneath the body 14. In other embodiments, the battery pod assembly 20 is otherwise positioned (e.g., within a tailgate of the refuse vehicle 10, beneath the cab 16, along the top of the body 14, within the body 14, etc.).

According to an exemplary embodiment, the battery pod assembly 20 is configured to receive, generate, and/or store power. The battery pod assembly 20 is also configured to provide electric power to the electric motor 18 to drive the wheels 22, electric actuators of the refuse vehicle 10 to facilitate operation thereof (e.g., lift actuators, tailgate actuators, packer actuators, grabber actuators, etc.), and/or other electrically operated accessories of the refuse vehicle 10 (e.g., displays, lights, user controls, etc.). The battery pod assembly 20 may include one or more rechargeable batteries (e.g., lithium-ion batteries, nickel-metal hydride batteries, lithium-ion polymer batteries, lead-acid batteries, nickel-cadmium batteries, iron-ion batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity. The electricity may be used to charge one or more batteries of the battery pod 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The battery pod assembly 20 may thereby be charged via an on-board generator (e.g., an internal combustion generator, a solar panel system, etc.), from an external power source (e.g., overhead power lines, mains power source through a charging input, etc.), and/or via a power regenerative braking system. In these arrangements, the battery pod assembly 20 may include a power interface structure to facilitate charging the batteries of the battery pod assembly. The power interface may be configured to receive power from the on-board generator or the external power source. The battery pod assembly 20 may then provide power to the electrically operated systems of the refuse vehicle 10. In some embodiments, the battery pod assembly 20 provides the power to the to the electrically operated systems of the refuse vehicle 10 via the power interface. In some embodiments, the battery pod assembly 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Figure 2:
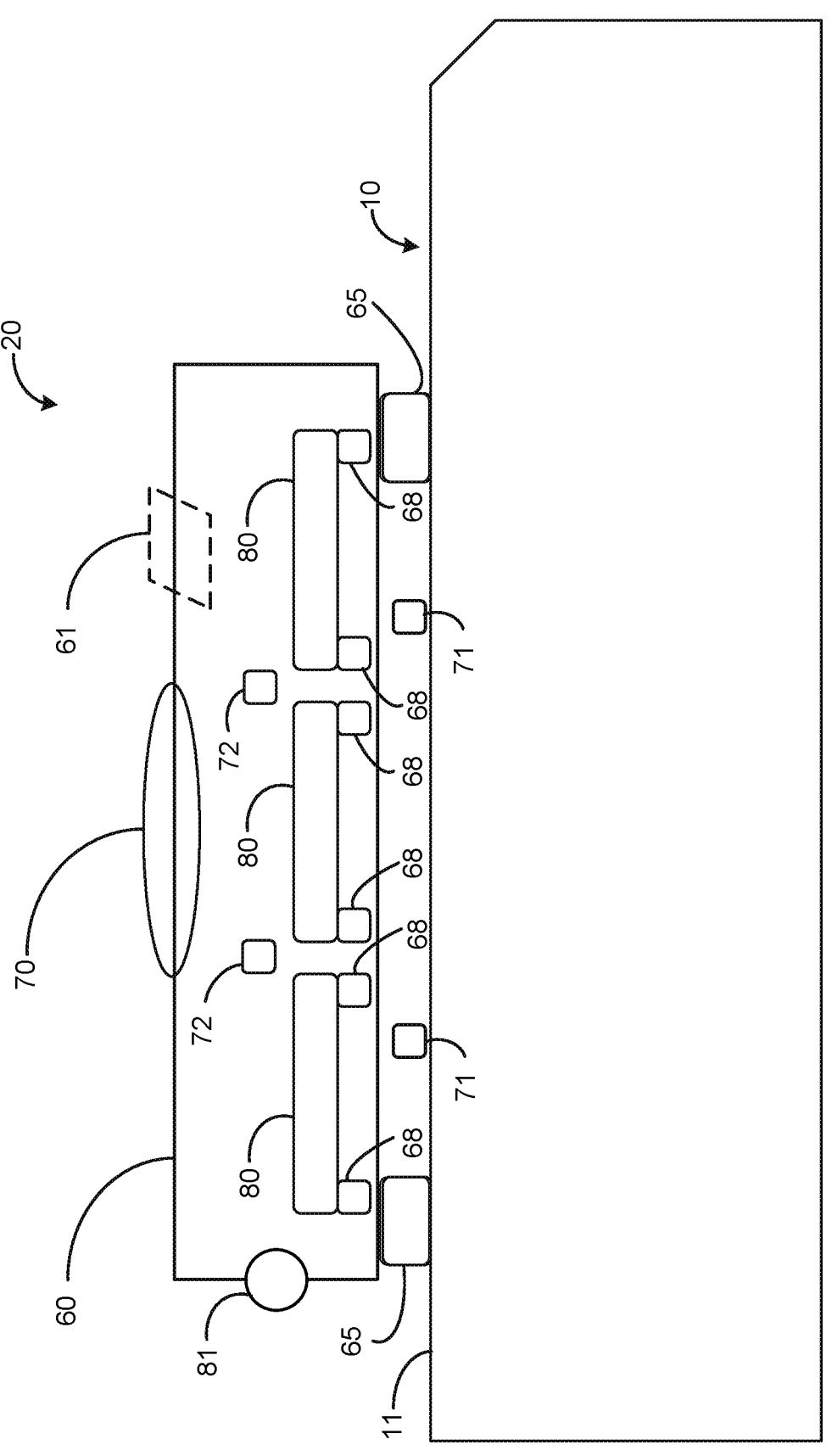
FIG. 2 is a side section view of a battery pod assembly, according to an exemplary embodiment.

As shown in FIG. 2, the battery pod assembly 20 is coupled to a portion 11 of the refuse vehicle 10. The battery pod assembly 20 includes a shell show as pod structure 60 and one or more energy storage devices shown as batteries 80. The pod structure 60 defines an internal volume 62 of the battery pod assembly 20. The pod structure 60 includes an portal shown as door 61. The door 61 allows a user to access the internal volume 62 from outside of the pod structure 60. The pod structure 60 is configured to mitigate the transmission of mechanical loads (e.g., vibrations, shock, stress, etc.) from outside the battery pod assembly 20 to the internal volume 62. Additionally, the pod structure 60 is configured to mitigate water, debris, or chemicals from entering the internal volume 62. In some embodiments, the pod structure 60 includes a thermal insulating layer configured to mitigate against thermal stress such as thermal cycling or thermal events. In other embodiments the pod structure 60 may also electrically couple the batteries 80 to each other and/or to the electrical systems of the refuse vehicle 10.

The battery pod assembly 20 includes one or more vehicle coupling devices shown as external dampers 65 (e.g., dampers and/or isolators). The external dampers 65 are disposed between the pod structure 60 and the refuse vehicle 10 and are configured to couple the battery pod assembly 20 to the portion 11 of the refuse vehicle 10. The dampers 65 are also configured to mitigate the transmission of active and/or passive mechanical loads from the refuse vehicle to the battery pod assembly 20 (e.g., to the pod structure 60). That is, the external dampers 65 are configured as mechanical dampers such as a mechanical dashpot, a fluid/hydraulic dashpot, a shock absorber, etc. In other embodiments, the battery pod assembly may include other coupling devices (e.g., pins, linkages, latches, etc.) to couple the pod structure 60 to the refuse vehicle 10.

The battery pod assembly 20 also includes one or more battery coupling devices shown as internal dampers 68 (e.g., dampers and/or isolators). The internal dampers 68 are disposed within the internal volume 62 and between the pod structure 60 and one or more of the batteries 80. The internal dampers 68 are configured to couple the batteries 80 to the pod structure 60. The internal dampers 68 are also configured to mitigate the transmission of active and/or passive mechanical loads from the pod structure 60 to the batteries 80. In some embodiments, the internal dampers 68 may be the same or substantially similar in structure to the external dampers 65. In other embodiments, the internal dampers 68 are configured as a different type of mechanical damper. For example, the external dampers 65 may be configured as fluid/hydraulic dashpots and the internal dampers 68 may be configured as mechanical dashpots.

In some embodiments, the external dampers 65 and/or the internal dampers 68 are also configured to capture energy from the active and/or passive mechanical loads. For example, the external dampers 65 and/or the internal dampers 68 may utilize piezoelectric systems or other suitable systems to capture active and/or passive vibrations passing through the external dampers 65 and/or the internal dampers 68.

The battery pod assembly 20 also includes a thermal management system 70. The thermal management system is configured to mitigate against thermal stress such as thermal cycling or thermal events. The source of the thermal stress may come from within the battery pod assembly 20 (e.g., typical thermal energy generation from a conventional battery) or from an external source (e.g., a thermal event near the refuse vehicle 10). In some embodiments, the thermal management system is configured to actively control the temperature of the battery pod assembly 20 within a specified range. Accordingly, the thermal management system 70 may advantageously improve the operation of the refuse vehicle, for example, by keeping the batteries 80 within ideal operating temperatures thus increasing the lifespan of the batteries 80.

The thermal management system includes various sensing devices shown as external sensors 71 and internal sensors 72. The external sensors 71 are positioned on or near the pod structure 60 and are configured to sense an external temperature of the battery pod assembly 20. The internal sensors 72 are positioned within the internal volume 62 and are configured to sense an internal temperature of the battery pod assembly 20.

According to various exemplary embodiments, the thermal management system 70 may include a cooling assembly configured to reduce the temperature of the battery pod assembly 20 and/or components thereof (e.g., the batteries 80). In some embodiments, the cooling assembly may utilize a liquid cooling system that includes a thermal transfer liquid, a cold plate, a pump, a radiator, and radiator fans. In other embodiments, the cooling assembly may utilize an air cooling system that includes a heatsink and fans. In still other embodiments, the cooling assembly may utilize other cooling systems including thermoelectric devices (e.g., Peltier), heat pumps, fans, radiators, etc.

In other exemplary embodiments, the thermal management 70 system includes a heating assembly configured to increase the temperature of the battery pod assembly 20 and/or components thereof (e.g., the batteries 80). The heating assembly may utilize an electric heating device or other heating systems such as a thermoelectric device (e.g., Peltier), heat pumps, etc.

In some embodiments, the thermal management system 70 includes a controller. In some embodiments, the controller 70 is part of a temperature control system of the refuse vehicle (e.g., a chassis temperature controller). In other embodiments, the controller 70 is a separate device coupled to the refuse vehicle 10. The controller may be coupled to one or more of the external sensors 71, the internal sensors 72, the cooling assembly, and the heating assembly. The controller may be configured to receive temperature data from one or more of the external sensors 71 and the internal sensors 72. The controller may also be configured to operate one or more of the cooling assembly and the heating assembly based on the temperature data. For example, one or more of the external sensors 71 and the internal sensors 72 may provide temperature data indicating that the battery pod assembly 20 is below ideal operating temperatures. The controller may operate the heating assembly to increase the operating temperature of the battery pod assembly 20.

Still referring to FIG. 2, the batteries 80 are configured to store and provide electrical energy. The batteries 80 may each have a single battery cell or multiple battery cells (e.g., a battery pack). Additionally, the batteries 80 may be configured to have a particular electrochemistry (e.g., lithium-ion, nickel-metal hydride, lithium-ion polymer, lead-acid, nickel-cadmium, iron-ion, etc.).

In some embodiments, the batteries 80 may be removably coupled to the battery pod assembly 20 (e.g., coupled to the pod structure 60 via the internal dampers 68) such that the batteries 80 are replaceable and/or upgradable. For example, a user may access the internal volume 62 to add, remove, replace and/or upgrade the batteries 80. In still other embodiments, the battery pod assembly 20 may be removably coupled to the refuse vehicle 10 such that a battery pod assembly 20 may be added, removed, replaced, and/or upgraded.

The battery pod assembly 20 may include an electric connection (e.g., a pantograph, a current collector, a high-voltage line, etc.) shown as power interface 81 to allow the battery pod assembly 20 to connect to external power sources (e.g., an overhead power line, the grid, a charging station, etc.). For example, the battery pod assembly 20 may include a charging port to allow the batteries 80 to be charged while the battery pod assembly 20 is coupled to the refuse vehicle 10 (e.g., by a 220V charger). In some embodiments, the battery pod assembly 20 includes an electrical bypass to power the refuse vehicle 10 from a charging source while the battery is being charged. In some embodiments, the battery pod assembly 20 connects to one or more power sources of refuse vehicle 10 (e.g., an internal combustion generator, a battery, etc.) to charge the batteries 80 of the battery pod assembly 20. For example, the battery pod assembly may include a connection to an onboard diesel generator configured to provide power to the battery pod assembly 20 for charging the batteries 80. In these arraignments, the battery pod assembly 20 may connect to internal or external power supplies or components via the power interface 81.

The battery pod assembly 20 may be modular such that the components of the battery pod assembly 20 may be easily removed, replaced, added, or upgraded. Additionally, the battery pod assembly 20 may be modular with itself such that two or more battery pods 20 may be coupled. For example, a particular refuse vehicle may require less power storage and therefore may include fewer batteries 80 within the batter pod assembly 20. Conversely, a refuse vehicle may require more power and include more batteries 80 and/or more battery pod assemblies 20. In these arrangements, the thermal management system may also be modular. For example, the thermal management system 70 may include a separate thermal management assembly (e.g., a heating assembly, a cooling assembly, etc.) for each of the batteries 80. Alternatively, the thermal management system 70 may include modular thermal transfer devices (e.g., a cold plate, etc.) for each of the batteries 80. For example, the cooling assembly may be configured as a water cooling assembly having one or more cold plates for each of the batteries 80 and quick disconnect tubing to easily add or remove batteries. Alternatively, the thermal management system 70 may include a modular rack system configured to receive the batteries 80. The modular rack system may be configured to provide heating and/or cooling to the batteries 80.

Now referring generally to FIGS. 3-10, the battery pod assembly 20 may be positioned in various locations on the refuse vehicle 10. For example, the battery pod may be coupled to the frame 12, the body 14, the cab 16, or other parts of the refuse vehicle 10. In other embodiments, the refuse vehicle 10 may include more than one battery pod assembly 20. In these arrangements, each of the battery pod assemblies 20 may similarly be coupled to the frame 12, the body 14, the cab 16, or other parts of the refuse vehicle 10. The geometry of the pod structure 60 may change to suitably conform to the location of the battery pod assembly 20.

Figure 3:
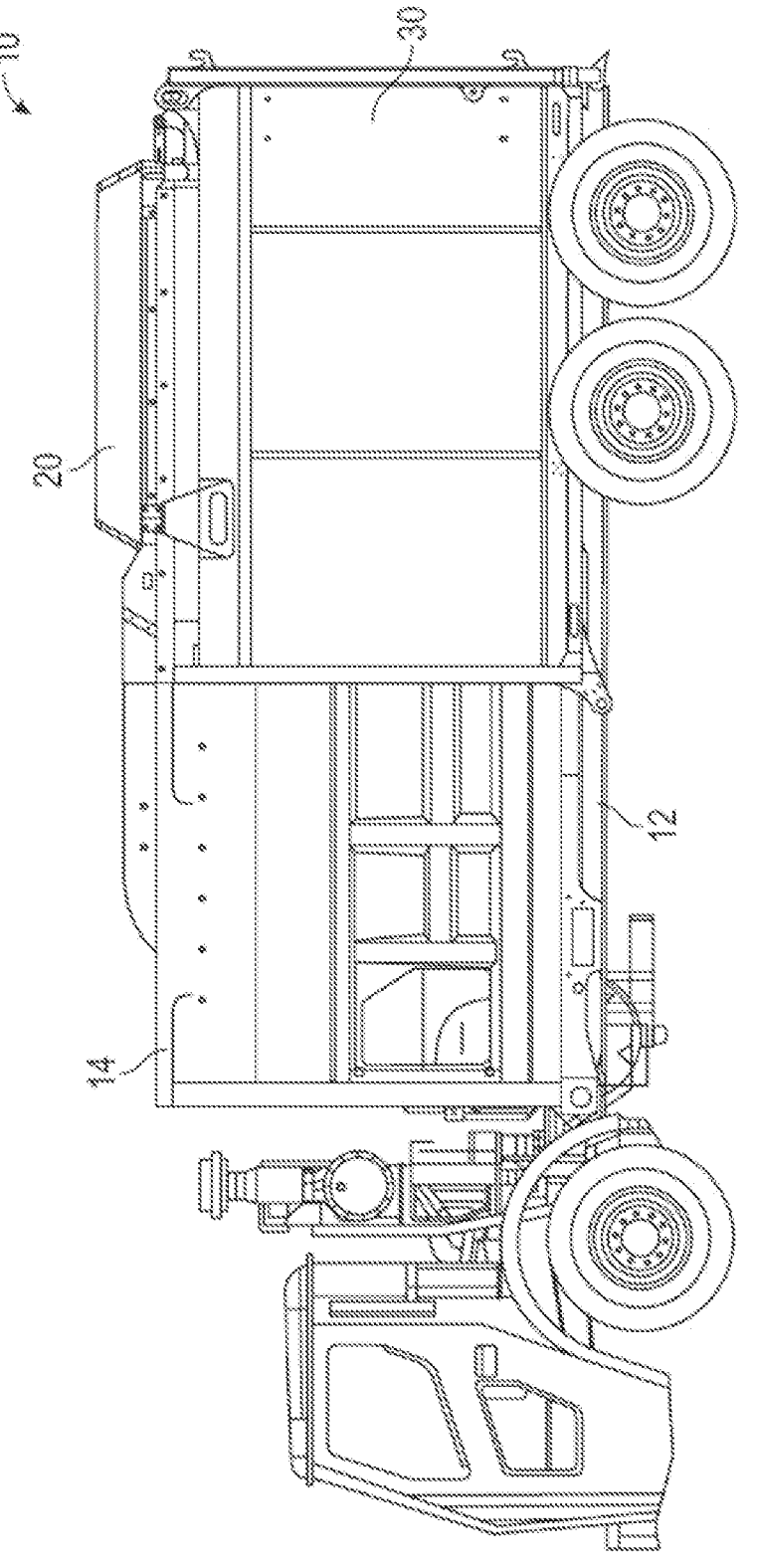
FIG. 3 is a side view of the refuse vehicle of FIG. 1 having a bottom mounted battery pod, according to an exemplary embodiment.

As shown in FIG. 3, the battery pod assembly 20 is coupled to the rearward top portion of the body 14. In other embodiments, the battery pod assembly 20 is coupled to the forward top portion of the body 14. In some embodiments, the battery pod assembly 20 is removable/detachable from the body 14. Locating the battery pod assembly 20 on top of the body 14 allows easy access to the battery pod assembly 20. For example, a user may readily inspect and service the battery pod assembly 20 because it is located on an external surface of the refuse vehicle 10.

Figure 4:
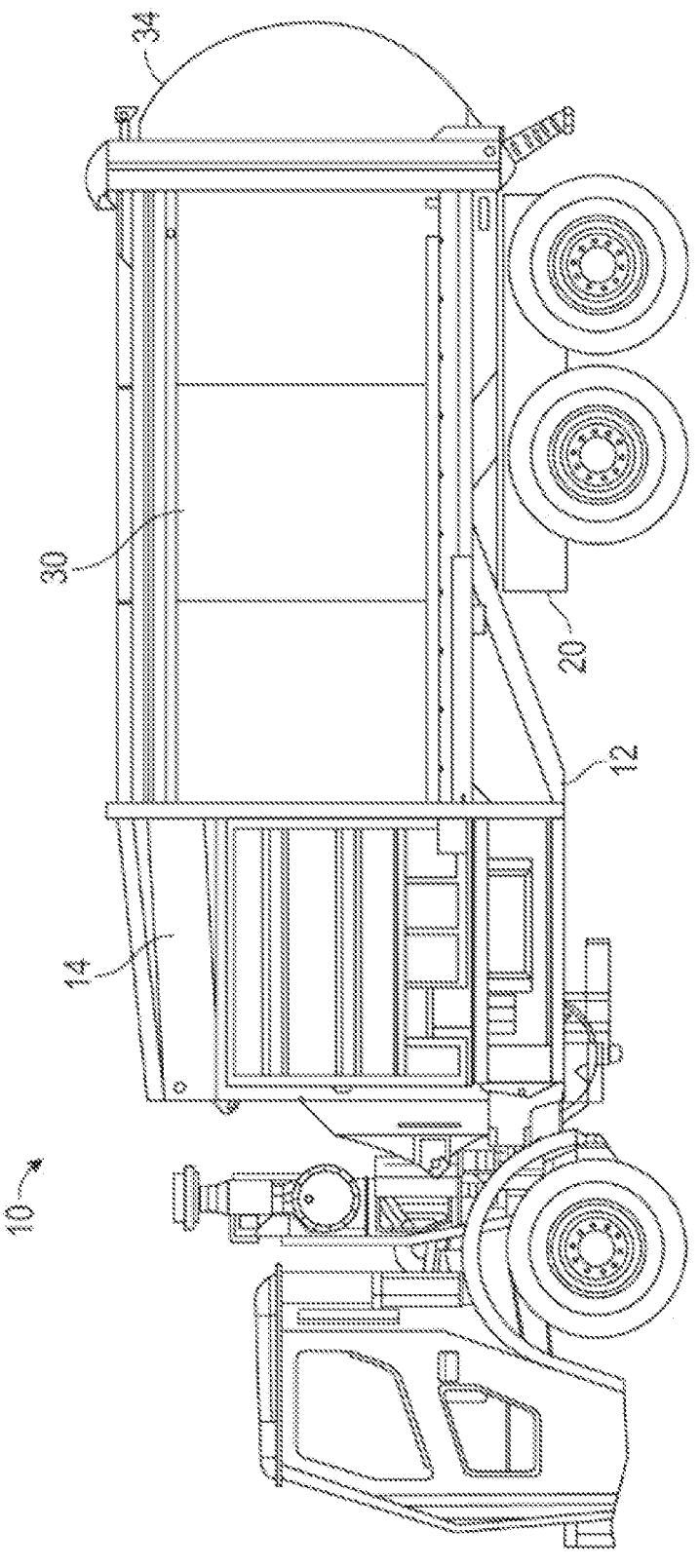
FIG. 4 is a side view of the refuse vehicle of FIG. 1 having a top mounted battery pod, according to an exemplary embodiment.

As shown in FIG. 4, the battery pod assembly 20 is coupled to the rearward bottom portion of the body 14. In other embodiments, the battery pod assembly 20 is coupled to the forward bottom portion of the body 14. As described above, battery pod assembly 20 may be removable/replaceable. For example, the refuse vehicle 10 may include a door on the side of the body 14 to allow removal and replacement of the battery pod assembly 20. In some embodiments, the battery pod assembly 20 is located on a track such that the battery pod assembly 20 can be slid out from the body 14 similar to a drawer.

Figure 5:
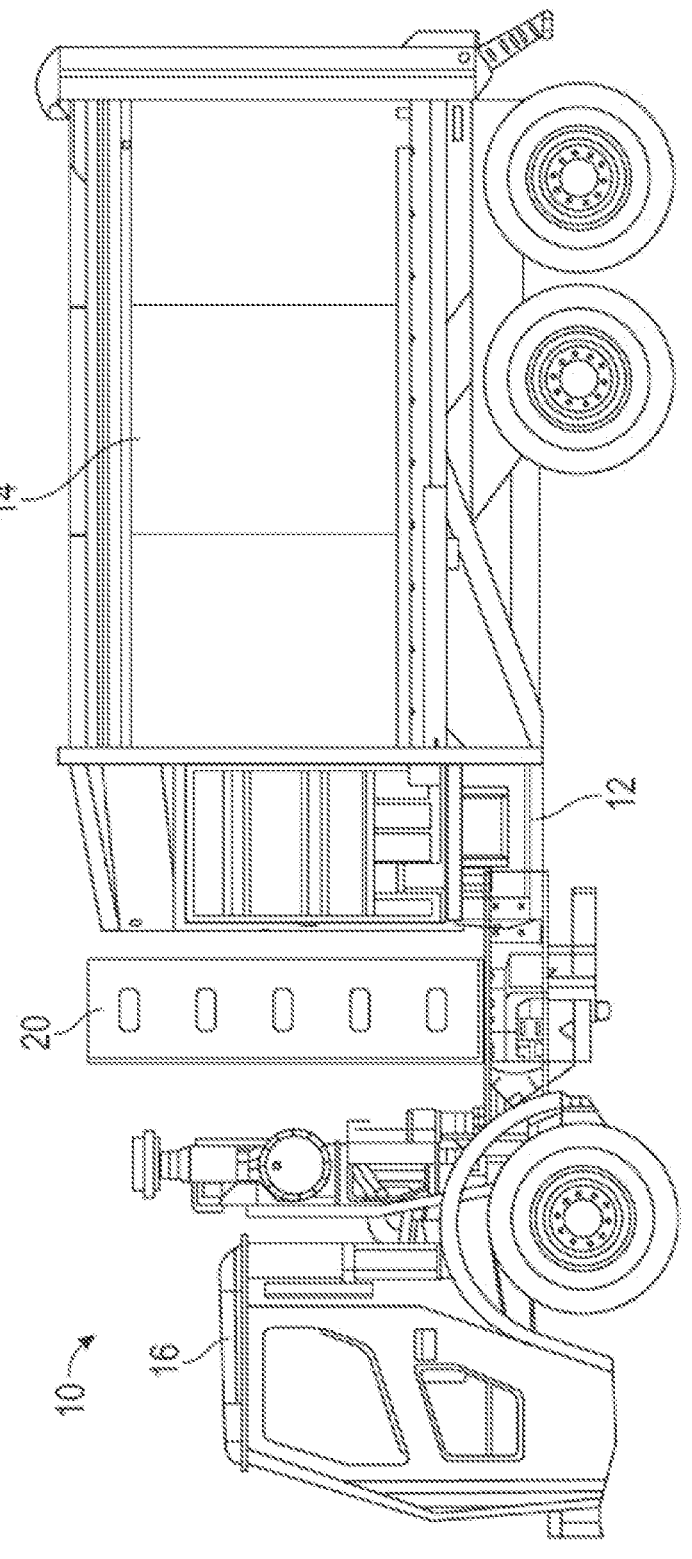
FIG. 5 is a side view of the refuse container of FIG. 1 having a centrally mounted battery pod, according to an exemplary embodiment.

As shown in FIG. 5, the battery pod assembly 20 is coupled between the cab 16 and the body 14. In some embodiments, the battery pod assembly 20 is coupled to the frame 12. Locating the battery pod assembly 20 between the cab 16 and the body 14 reduces a rear weight of the refuse vehicle 10, thereby reducing component stress of weight bearing members (e.g., a rear axle). Furthermore, centrally locating the battery pod assembly 20 protects the battery pod assembly 20 from damage in a mechanical impact event. Furthermore, centrally locating the battery pod assembly 20 allows easy modification/retrofitting of existing refuse vehicles to include the battery pod assembly 20. The battery pod assembly 20 may be easily accessed and/or removed from the refuse vehicle 10. For example, the battery pod assembly 20 may include forklift pockets so that a forklift may easily remove the battery pod assembly 20 from the refuse vehicle 10. In some embodiments, the battery pod assembly 20 includes one or more eyelet connectors to receive a lifting hook or similar hoisting attachment. The battery pod assembly 20 may be configured to connect to an external rail system to quickly replace the battery pod assembly 20 by sliding it orthogonally off the refuse vehicle 10.

In some embodiments, the battery pod assembly 20 is configured to dynamically change position on the refuse vehicle 10 based on loading of the refuse vehicle 10. For example, the battery pod assembly 20 may translate horizontally along the frame 12 toward the cab 16 or toward the body 14 to change a weight distribution of the vehicle. In some embodiments, the battery pod assembly 20 includes one or more controllers to measure the weight distribution of the refuse vehicle 10 and adjust a position of the battery pod assembly 20 accordingly.

Figure 6:
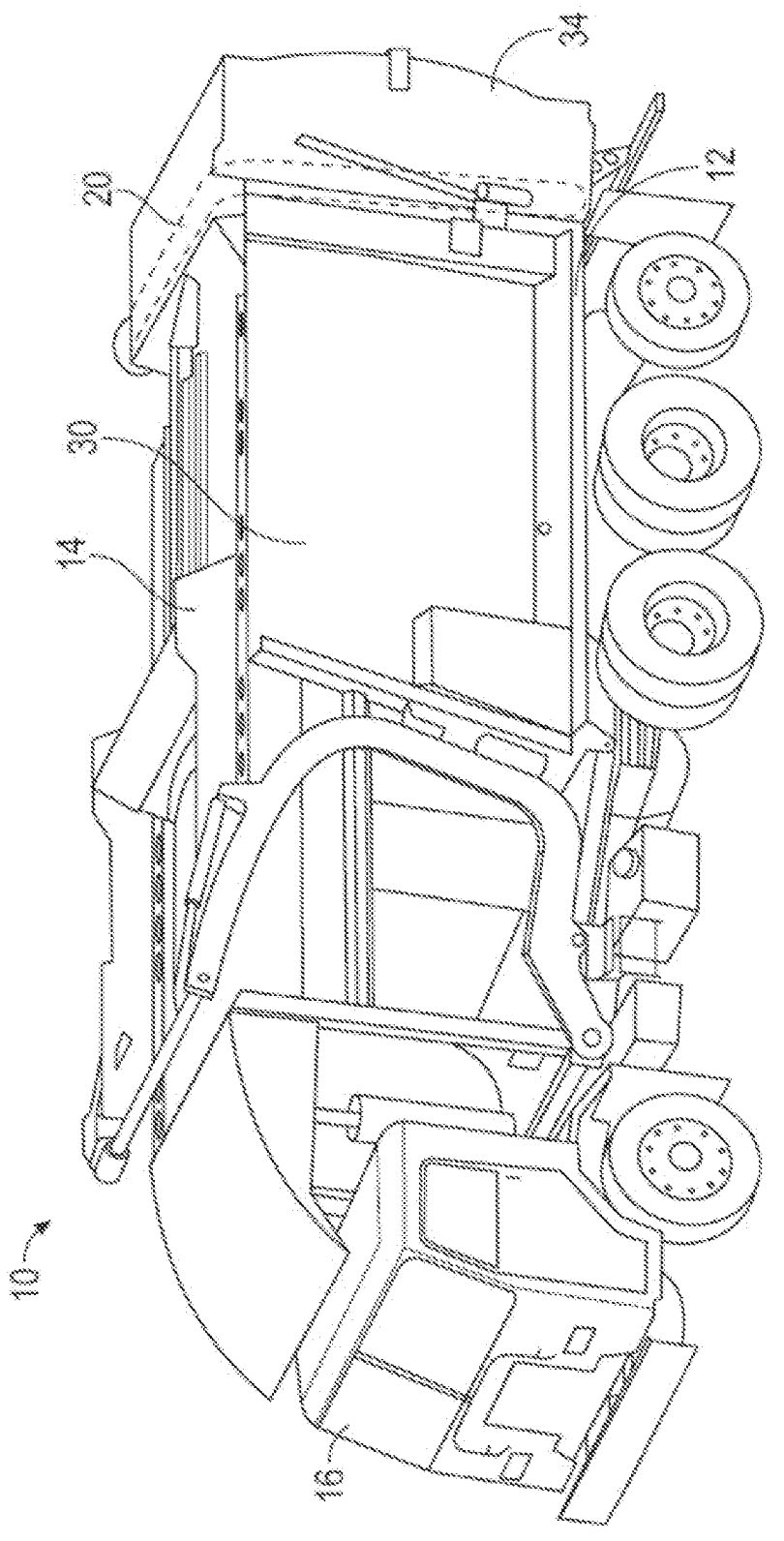
FIG. 6 is a perspective view of the refuse container of FIG. 1 having a tailgate mounted battery pod, according to an exemplary embodiment.

As shown in FIG. 6, the battery pod assembly 20 is coupled to the tailgate 34 of the refuse vehicle 10. In some embodiments, the battery pod assembly 20 is positioned vertically along a rearward side of the refuse compartment 30. In some embodiments, the battery pod assembly 20 is positioned substantially near the base of the tailgate 34 or as part of the tailgate 34. The battery pod assembly 20 may be configured to be accessible via the tailgate 34. For example, a user could open the tailgate 34 to reveal battery pod assembly 20. In some embodiments, the tailgate 34 includes one or more rotating elements (e.g., hinges, mechanical bearings) to facilitate rotation around a rearward corner of the refuse compartment 30. For example, the tailgate 34 could include one or more hinging mechanisms on a side to allow a user to open the tailgate 34 like a door and gain access to the battery pod assembly 20 located along the frame 12 of the refuse vehicle 10. In some embodiments, the tailgate 34 is a double door. Swinging the tailgate 34 open like a door requires less energy than lifting the tailgate 34.

In some embodiments, the tailgate 34 is fully integrated with the battery pod assembly and is configured to be removable/replaceable. For example, a first tailgate 34 having a first battery pod assembly 20 could be replaced by a second tailgate 34 having a second battery pod assembly 20 when the batteries 80 of the first battery pod assembly 20 are depleted of energy. Removing and replacing the tailgate 34 may limit loss of vehicle operation due to charging time because the tailgate 34 including the depleted battery pod assembly 20 may be charged separately of the refuse vehicle 10. Furthermore, swappable battery pod assemblies enable a smaller fleet of refuse vehicles to service the same area because the reduced downtime associated with battery charging enables the refuse vehicles to operate for longer periods of time. In some embodiments, a number of racks index one or more battery cells of the battery pod assembly 20.

Figure 7:
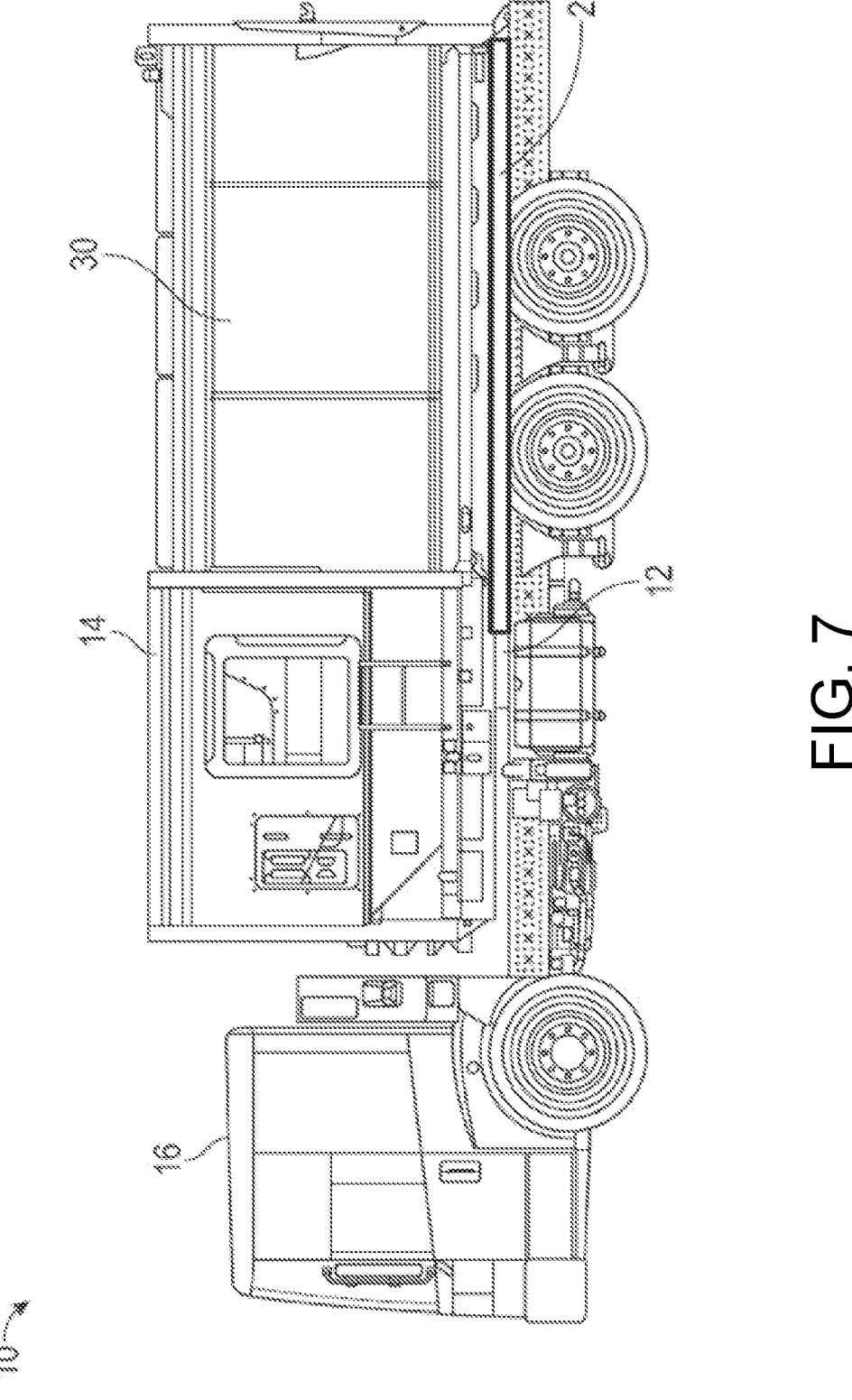
FIG. 7 is a side view of the refuse container of FIG. 1 having a frame mounted battery pod, according to an exemplary embodiment.

As shown in FIG. 7, the battery pod assembly 20 is coupled between the body 14 and the frame 12 (e.g., on a sub-frame). As described above, in some embodiments, the battery pod assembly 20 may be configured to translate horizontally along the frame 12 of the refuse vehicle 10. For example, the battery pod assembly 20 could move between a forward portion and a rearward portion of the body 14 of the refuse vehicle 10 such that the refuse vehicle 10 is evenly loaded. As described above, in some embodiments, the battery pod assembly 20 is removable and/or replaceable. The battery pod assembly 20 may be accessed via a door on a side of the body 14 or via the tailgate 34. Similarly, the battery pod assembly 20 may be removed and/or replaced by another battery pod assembly. Alternatively, one or more individual battery cells (e.g., batteries 80 of FIG. 2) of the battery pod assembly 20 could be replaced. In some embodiments, the battery pod assembly 20 can be accessed by removing the refuse compartment 30. For example, a refuse vehicle with a removable refuse compartment (e.g., a container truck) may remove the refuse compartment to reveal the battery pod assembly 20. In some embodiments, the battery pod assembly 20 is coupled to the refuse compartment 30 itself and can be removed with the refuse compartment 30. For example, a refuse vehicle could swap a first full refuse compartment with a first battery pod assembly having depleted batteries for a second empty refuse compartment with a second battery pod assembly having charged batteries.

Figure 8A:
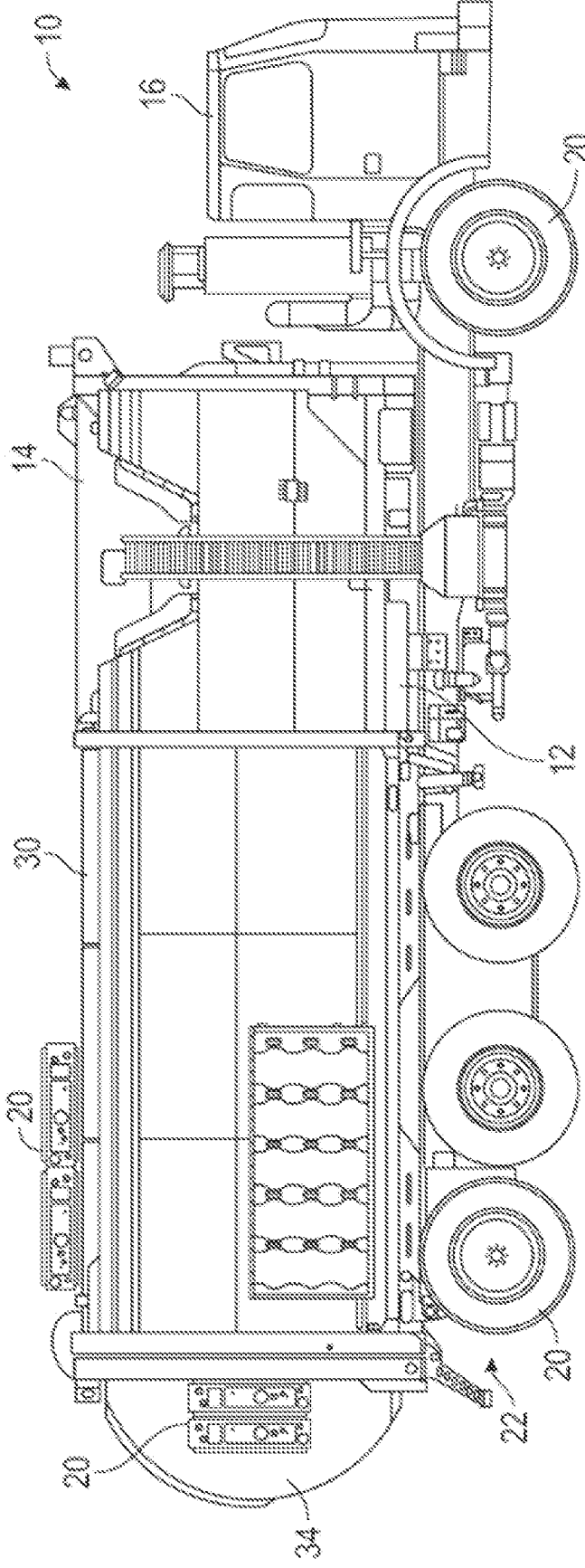
FIGS. 8A-9B are the refuse vehicle of FIG. 1 having multiple battery pods, according to several exemplary embodiments.
Figure 8B:
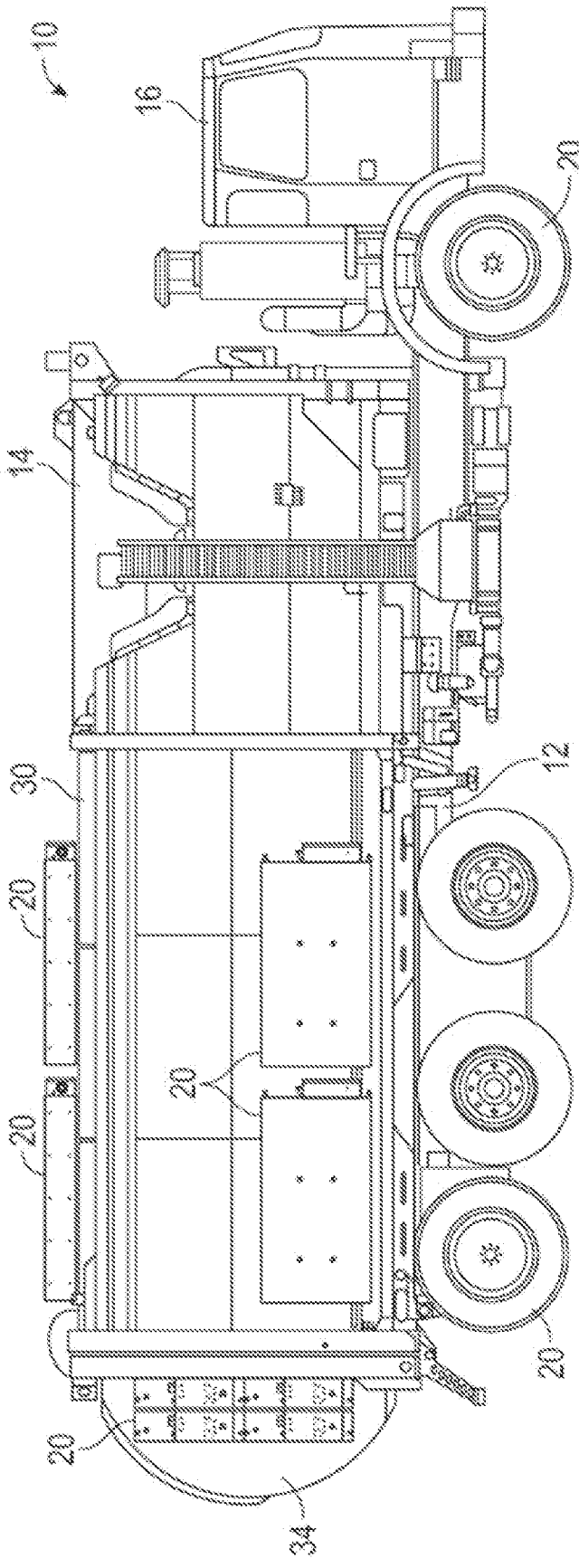
Figure 8C:
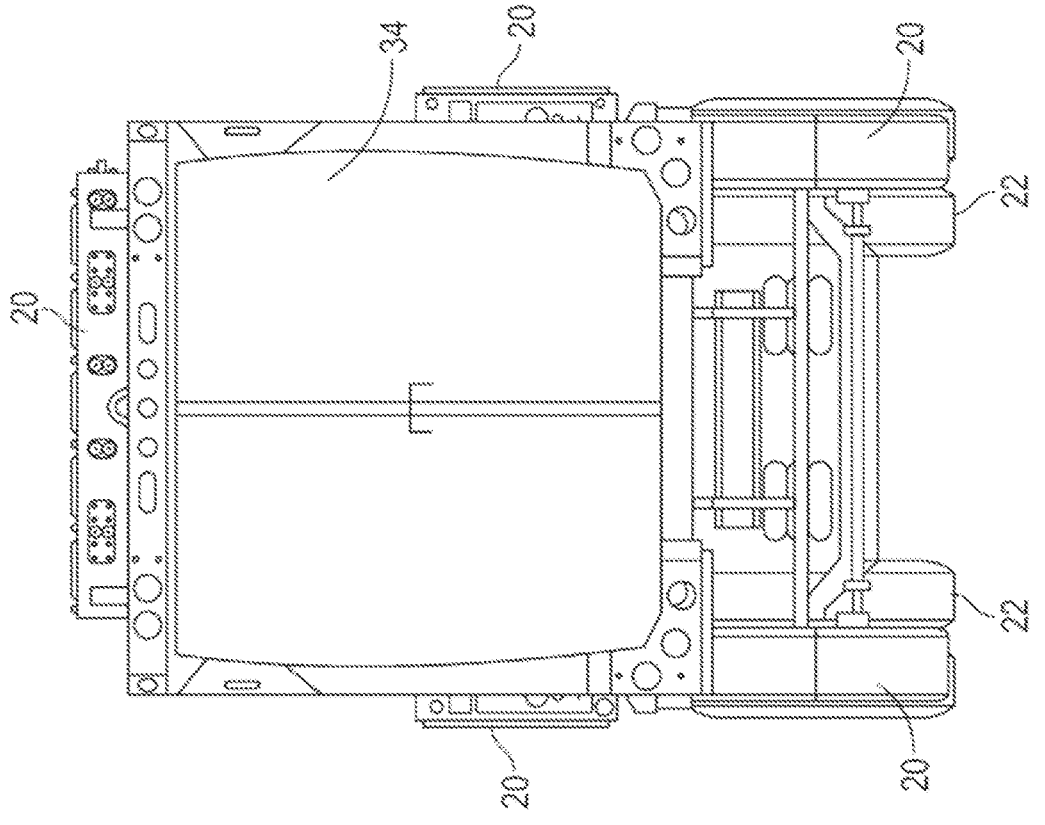
Figure 9A:
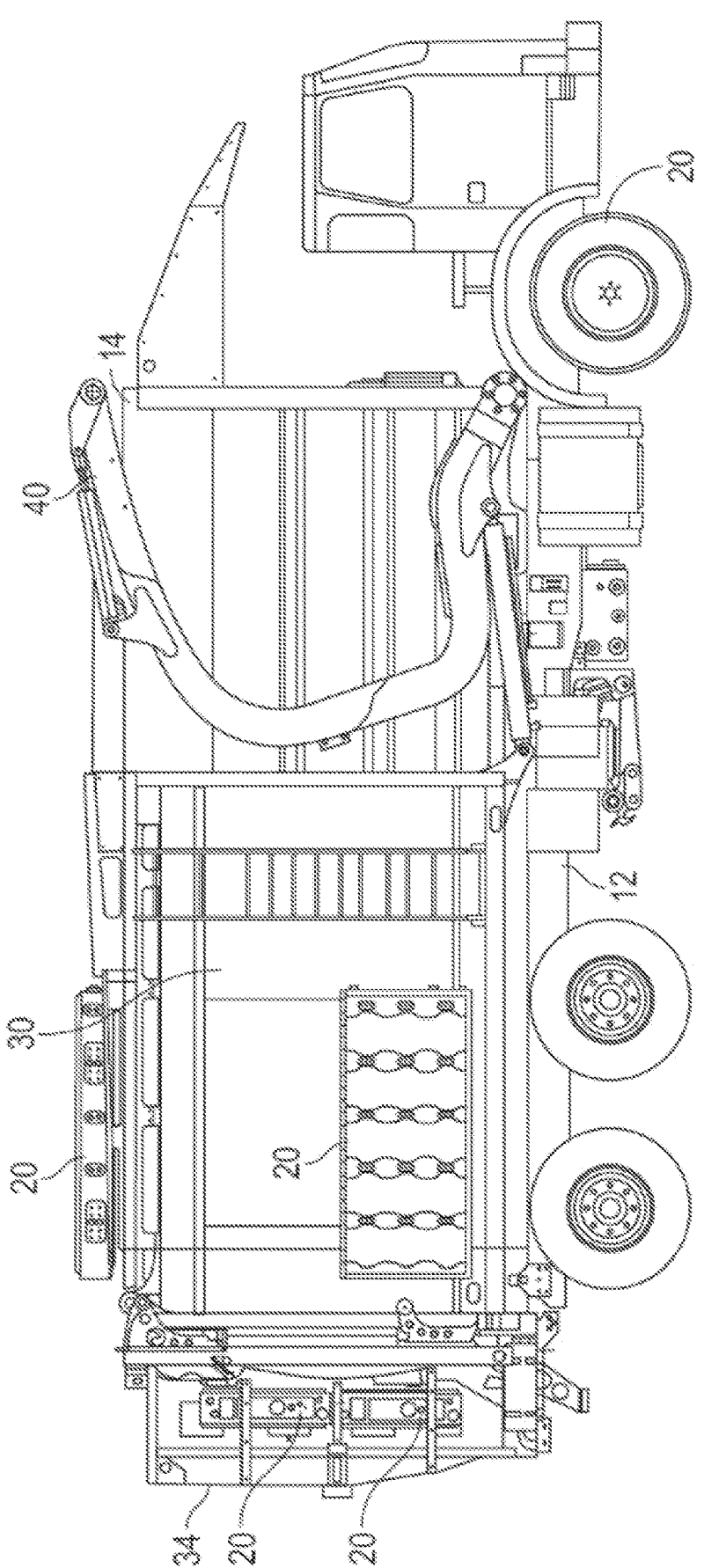
Figure 9B:
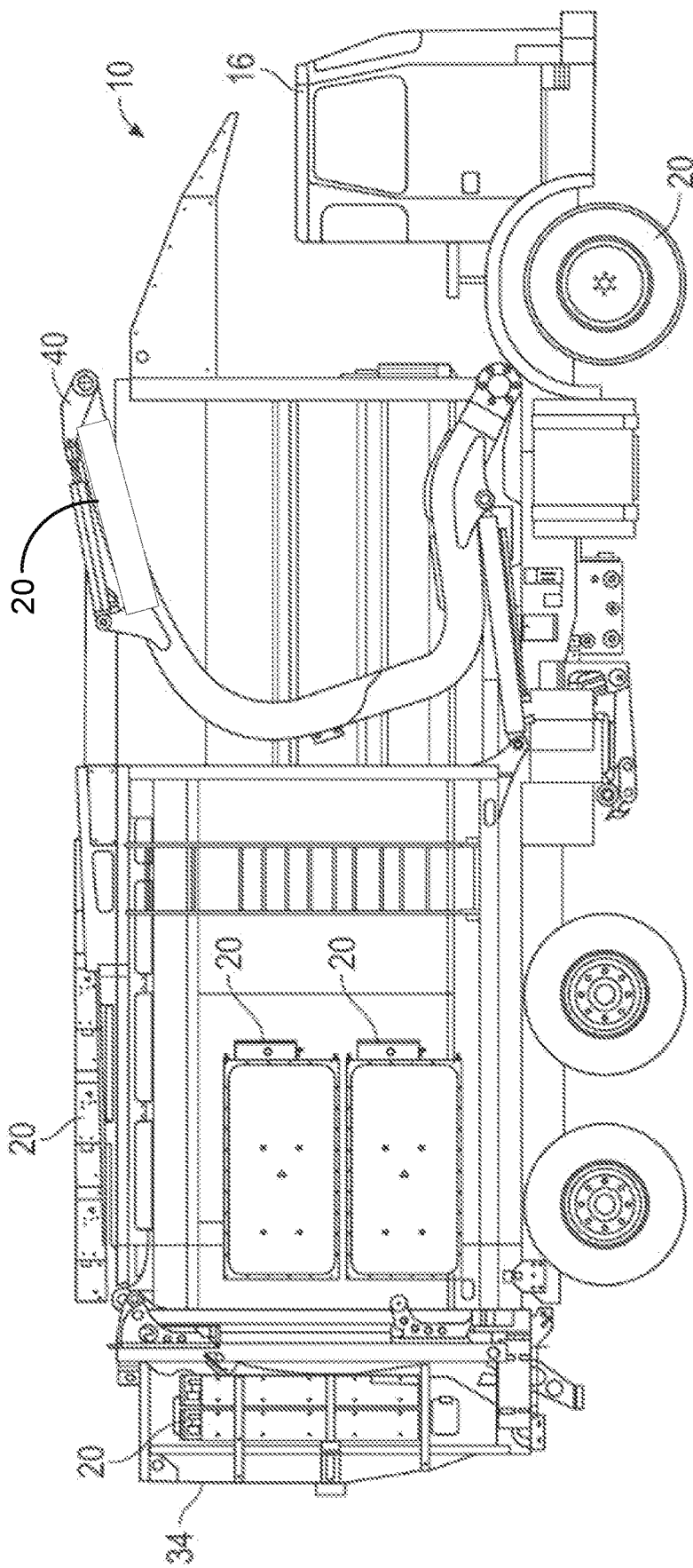

Referring now to FIGS. 8A-9B, several illustrations of an exemplary placement of the battery pod assembly 20 are shown, according to several exemplary embodiments. In various embodiments, the battery pod assembly 20 is coupled to a rearward top portion of the refuse vehicle 10 (e.g., above the refuse compartment 30, etc.). Additionally or alternatively, the battery pod assembly 20 is coupled to a rearward portion of the refuse vehicle 10. For example, the battery pod assembly 20 may be coupled to the tailgate 34 and/or a rearward portion of the refuse compartment 30 (e.g., as shown in FIGS. 8A-8C). As another example, the battery pod assembly 20 may be coupled to a vertical rear surface of the refuse compartment 30. In some embodiments, the battery pod assembly 20 or components thereof are coupled to the wheel 22. In some embodiments, the battery pod assembly 20 is coupled to a front and rear wheelset of the refuse vehicle 10 (e.g., as shown in FIGS. 8A-8C). In various embodiments, placement of the battery pod assembly 20 as shown in FIGS. 8A-8C facilitates shifting weight rearward on the refuse vehicle 10, thereby reducing strain on forward load bearing components (e.g., a front axle, etc.). In some embodiments, the placement of the battery pod assembly 20 shown in FIGS. 8A-8C is preferred for a rear-loading refuse vehicle 10. In various embodiments, the battery pod assembly 20 includes a different number and/or arrangement of components than shown explicitly in the FIGURES. For example, the battery pod assembly 20 may include a first component coupled to an exterior hub surface of the front wheels 22 electrically coupled to a second component integrated with the tailgate 34. In some embodiments, the placement of the battery pod assembly 20 shown in FIGS. 9A-9B is preferred for a front-loading refuse vehicle 10 and/or a side-loading refuse vehicle 10. For example, the battery pod assembly 20 may be positioned on the lift assembly 40. In various embodiments, the battery pod assembly 20, or components thereof, are detachable from the refuse vehicle 10 as described in detail above.

Figure 10A:
FIGS. 10A-10B are the refuse vehicle of FIG. 1 having a top mounted battery pod, according to several exemplary embodiments.
Figure 10B:
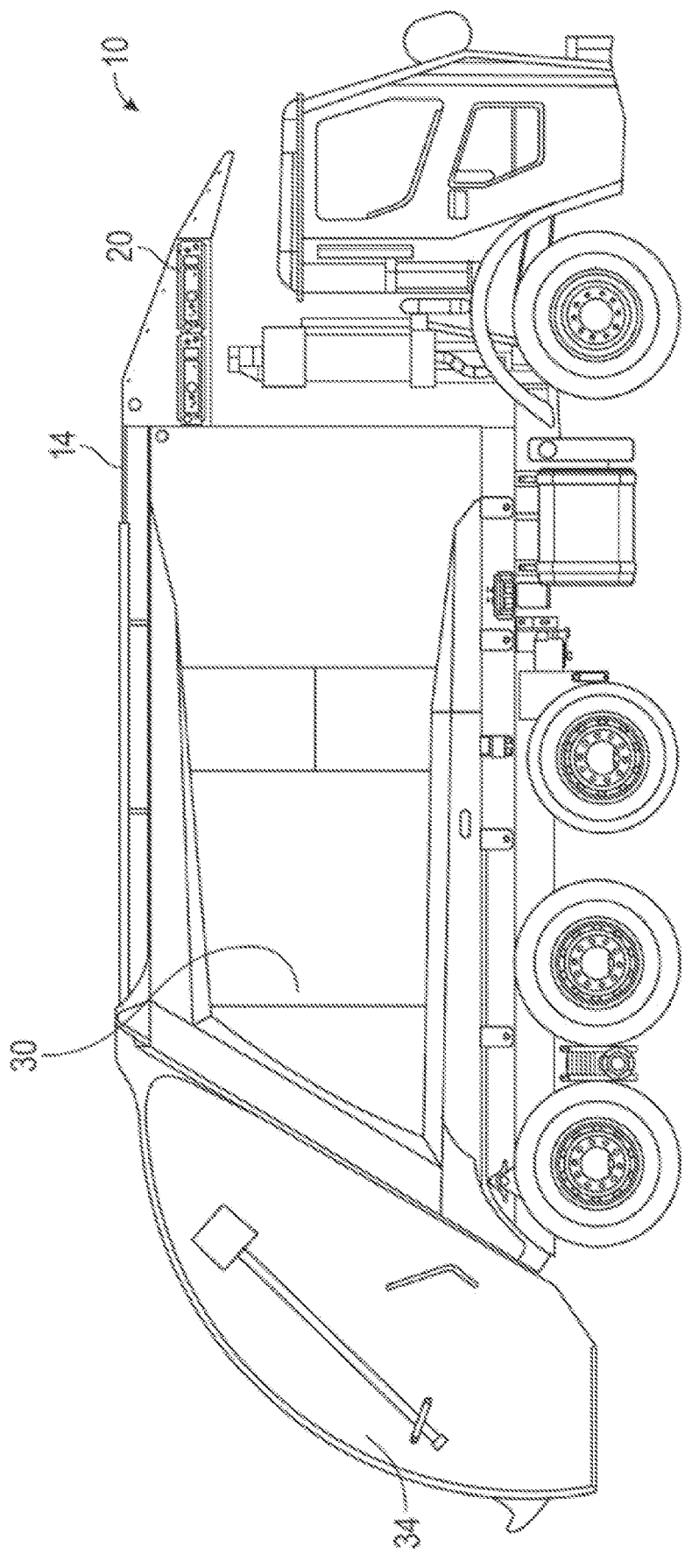

Referring now to FIGS. 10A-10B, several illustrations of another exemplary placement of the battery pod assembly 20 are shown, according to several exemplary embodiments. In various embodiments, the battery pod assembly 20 is coupled to a top portion of the refuse vehicle 10. For example, the battery pod assembly 20 may be coupled to a top portion of refuse compartment 30 and/or above the cab 16 (e.g., as shown in FIGS. 10A-10B). In some embodiments, the battery pod assembly 20 is coupled to a canopy (or other structural element) located above the cab 16. Additionally or alternatively, the battery pod assembly 20, or components thereof, may be coupled to the wheels 22. For example, a first component of the battery pod assembly 20 (e.g., a battery cell, etc.) may be coupled to an exterior hub region of the wheels 22 and a second component of the battery pod assembly 20 (e.g., a power converter, etc.) may be coupled to a structural element (e.g., a portion of frame 12, etc.) above the cab 16. In some embodiments, the placement of the battery pod assembly 20 shown in FIGS. 10A-10B is preferred for a rear-loading refuse vehicle 10. In various embodiments, the placement of the battery pod assembly 20 as shown in FIGS. 10A-10B facilitates moving weight (e.g., battery weight, etc.) forward on the refuse vehicle 10 (e.g., toward the cab 16 and away from the tailgate 34, etc.), thereby reducing stress on rear load-bearing components (e.g., a rear axle, etc.).

Referring now to FIGS. 11A-11B and 12A-12B, the refuse vehicle 10 includes one or more batteries 100 (e.g., electrical energy storage devices, battery cells, housings including battery cells, etc.) for providing electrical power or electrical energy to various electrical components of the refuse vehicle 10, according to an exemplary embodiment. For example, the batteries 100 can provide or discharge electrical energy to power one or more components, devices, lift assemblies, compaction apparatuses, chassis systems, body systems, accessories, lights, etc., of the refuse vehicle 10. The batteries 100 described herein may be the same as or similar to the battery pod assembly 20 described in greater detail above, according to one exemplary embodiment. In another exemplary embodiments, the batteries 100 described herein can be housings that are structurally coupled with the refuse vehicle 10 that include battery cells (e.g., batteries 80).

Figure 11A:
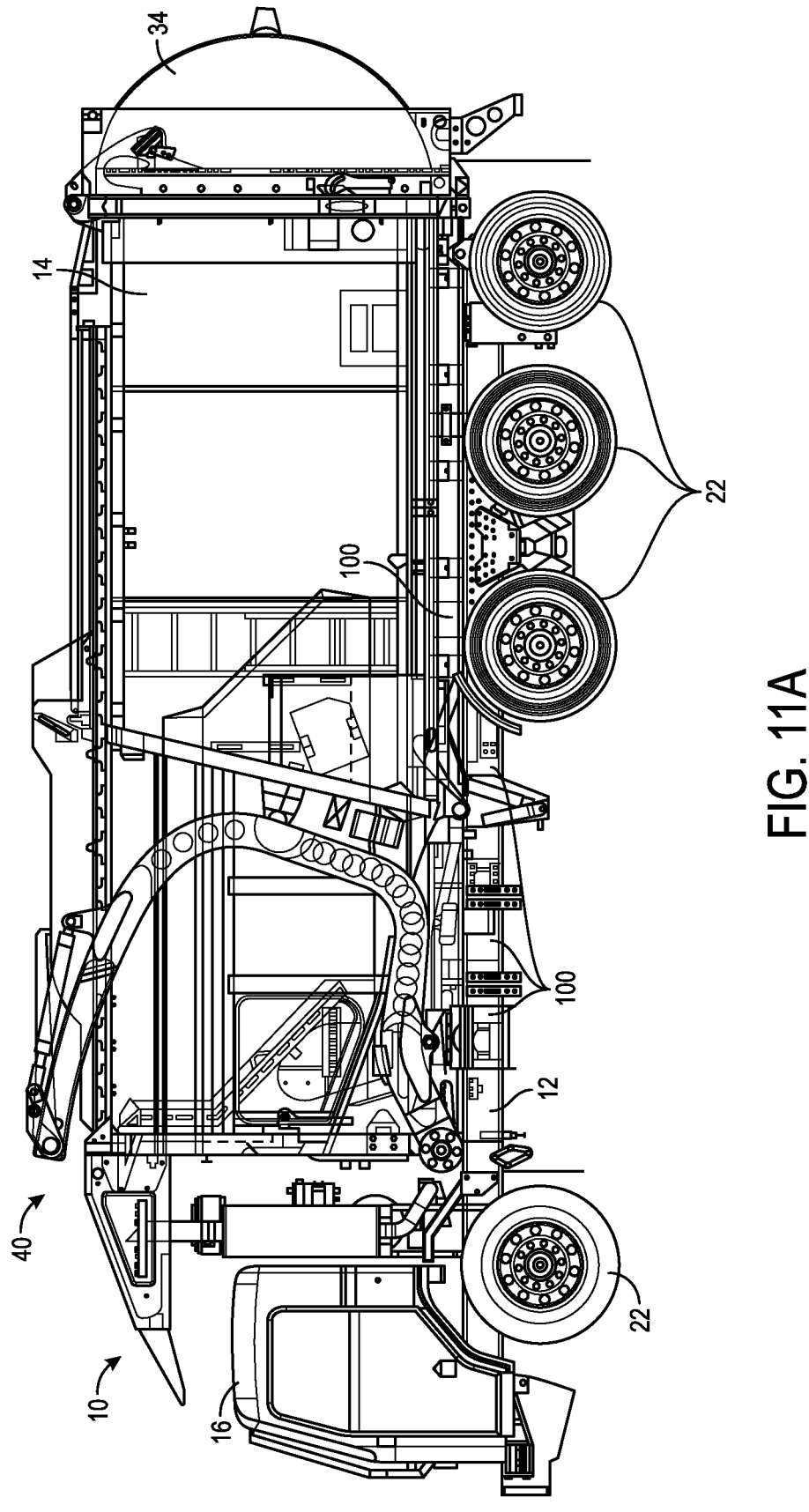
FIG. 11A is a side view of the refuse vehicle of FIG. 1 having batteries positioned between chassis frame rails of the refuse vehicle, according to an exemplary embodiment.
Figure 11B:
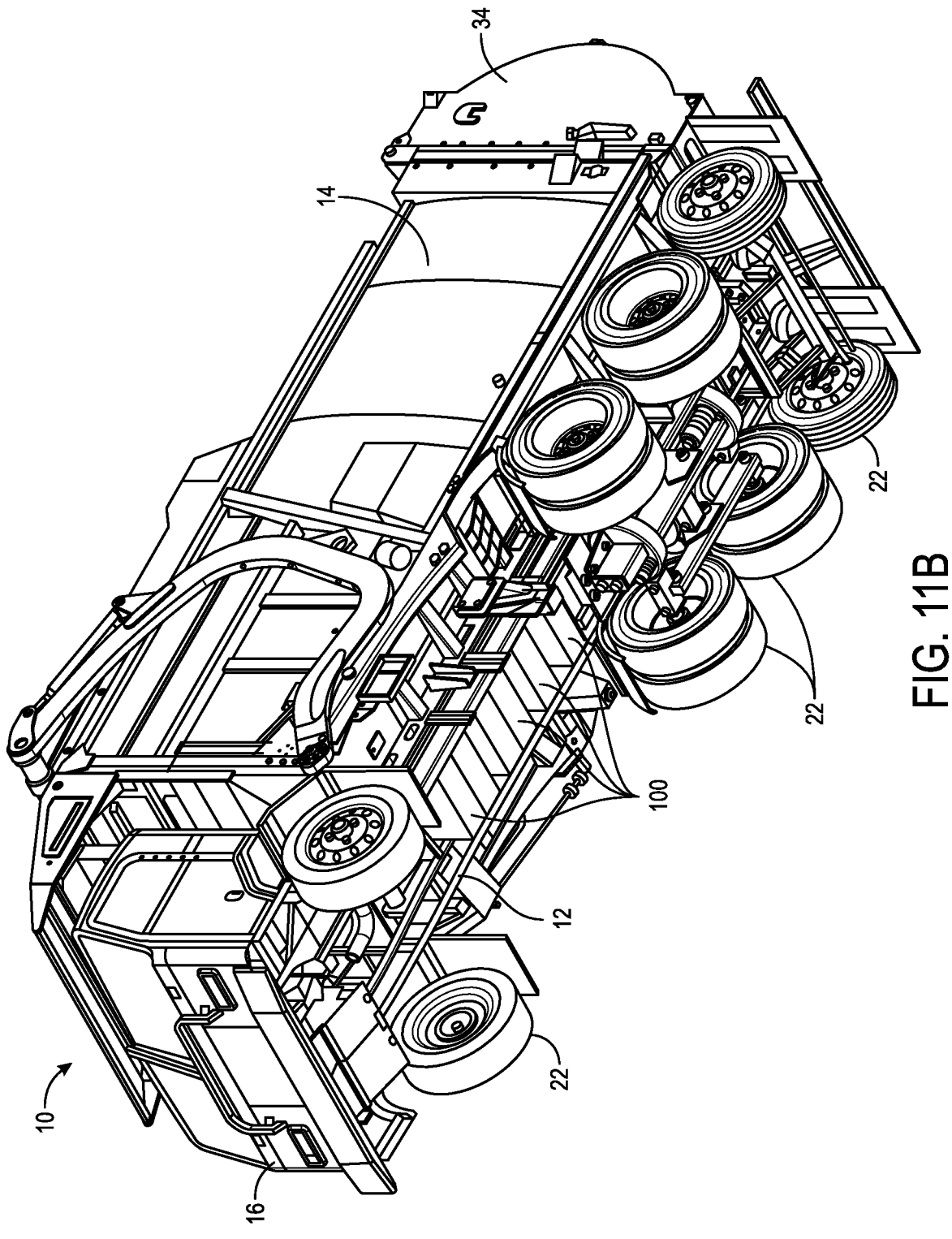
FIG. 11B is a perspective view of the refuse vehicle of FIG. 1 having batteries positioned between the chassis frame rails of the refuse vehicle, according to an exemplary embodiment.
Figure 11C:
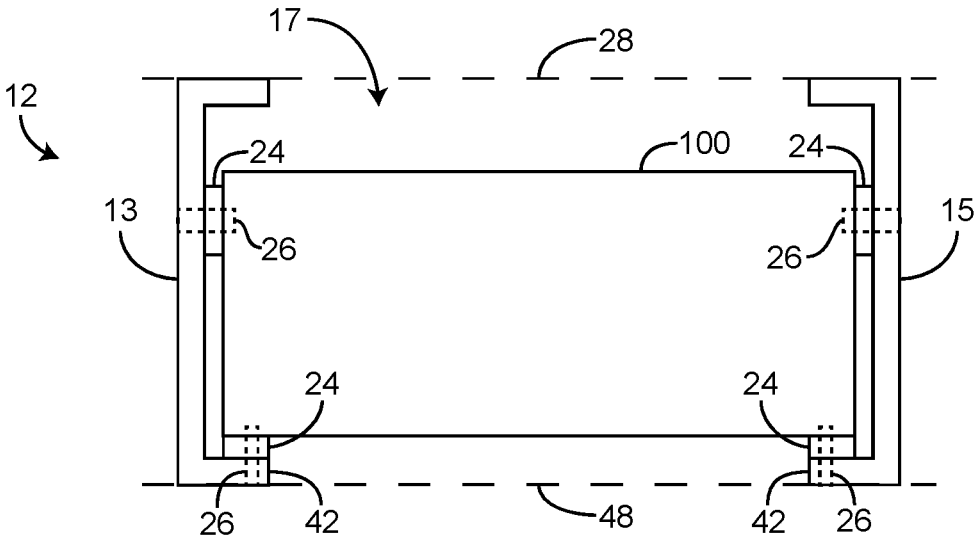
FIG. 11C is a diagram of a battery positioned between C-shaped chassis frame rails of a refuse vehicle, according to an exemplary embodiment.
Figure 11D:
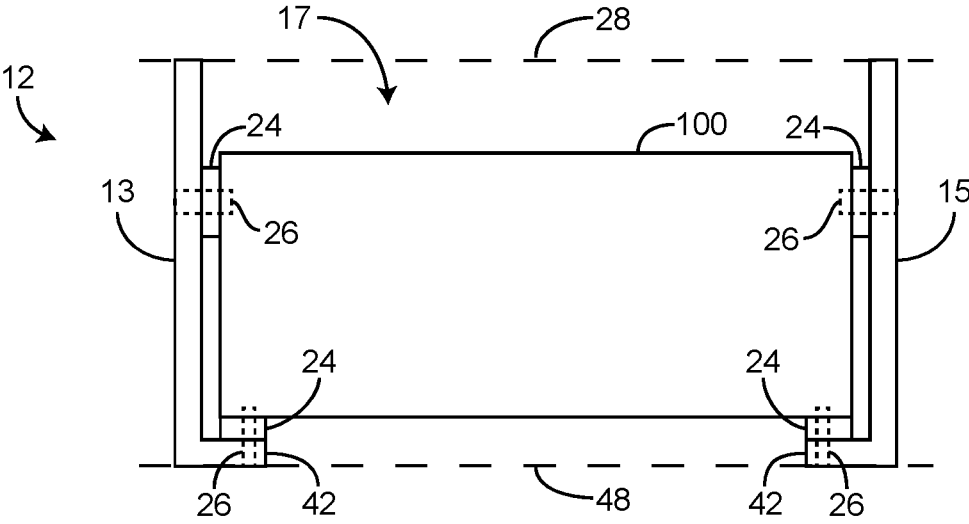
FIG. 11D is a diagram of a battery positioned between L-shaped chassis frame rails of a refuse vehicle, according to an exemplary embodiment.

Referring particularly to FIGS. 11A-11D, the batteries 100 can be positioned between rails of the frame 12, according to an exemplary embodiment. The frame 12 can include a left frame member 15 and a right frame member 13 that are spaced apart in a lateral direction perpendicular to the longitudinal direction. The frame 12 extends in and/or defines a longitudinal direction of the refuse vehicle 10. The batteries 100 can be spaced apart along the left frame member 15 and the right frame member 13. Referring particularly to FIGS. 11C-11D, the right frame member 13 and the left frame member 15 can be C-shaped brackets (shown in FIG. 11C), L-shaped brackets (shown in FIG. 11D), or any other shaped brackets. The right frame member 13 and the left frame member 15 define a space, a volume, an area, a gap, etc., therebetween, shown as space 17. The space 17 may have a height that is substantially equal to a height (e.g., in a lateral direction) of the right frame member 13 and the left frame member 15. In some embodiments, the batteries 100 are positioned within the space 17 between the right frame member 13 and the left frame member 15. In some embodiments, the batteries 100 are positioned between the right frame member 13 and the left frame member 15 and are longitudinally spaced (as shown in at least FIGS. 11A-11B) along the frame 12. The batteries 100 can be equally spaced along the frame 12, or unevenly spaced.

Referring particularly to FIGS. 11C-11D, the batteries 100 can be coupled with the right frame member 13 and the left frame member 15 along a top, a bottom, or sides of the batteries 100. For example, the batteries 100 can be coupled with the right frame member 13 and the left frame member 15 through fasteners 26 and dampers 24. The dampers 24 can be positioned between an interior surface of the right or left frame members 13 or 15 and an exterior surface of the batteries 100 (or a housing thereof) to absorb vibrations that may occur when the refuse vehicle 10 operates (e.g., as the refuse vehicle 10 transports). The fasteners 26 may pass through an opening of the dampers 24 and extend a distance into the batteries 100 (e.g., a housing of the batteries 100) and at least partially into the right frame member 13 or the left frame member 15.

In some embodiments, a top portion, a top edge, an upper periphery, etc., of the frame 12 defines a first plane or a first boundary 28 (e.g., an upper periphery or boundary of the space 17), and a bottom portion, a bottom edge, a lower periphery, etc., of the frame 12 defines a second plane or a second boundary 48 (e.g., a lower periphery or boundary of the space 17). In some embodiments, the batteries 100 are positioned entirely within the space 17 between the first boundary 28 and the second boundary 48. In some embodiments, the batteries 100 are positioned above the second boundary 48 so that the batteries 100 do not protrude downwards beyond the second boundary 48.

In some embodiments, dampers 24 and fasteners 26 are used to couple the batteries 100 with a bottom portion 42 of the right frame member 13 and the left frame member 15 (e.g., if the frame members 13 and 15 include bottom flanges such as in the L-shaped and C-shaped configurations shown in FIGS. 11C-11D). In some embodiments, the batteries 100 rest on top of the bottom portions 42 of the right frame member 13 and the left frame member 15 (e.g., with or without the dampers 24 positioned therebetween). In some embodiments, the dampers 24 and fasteners 26 are arranged along a top or bottom surface to absorb longitudinal vibrations, and/or along sides of the batteries 100 to absorb transverse or lateral vibrations.

Figure 12A:
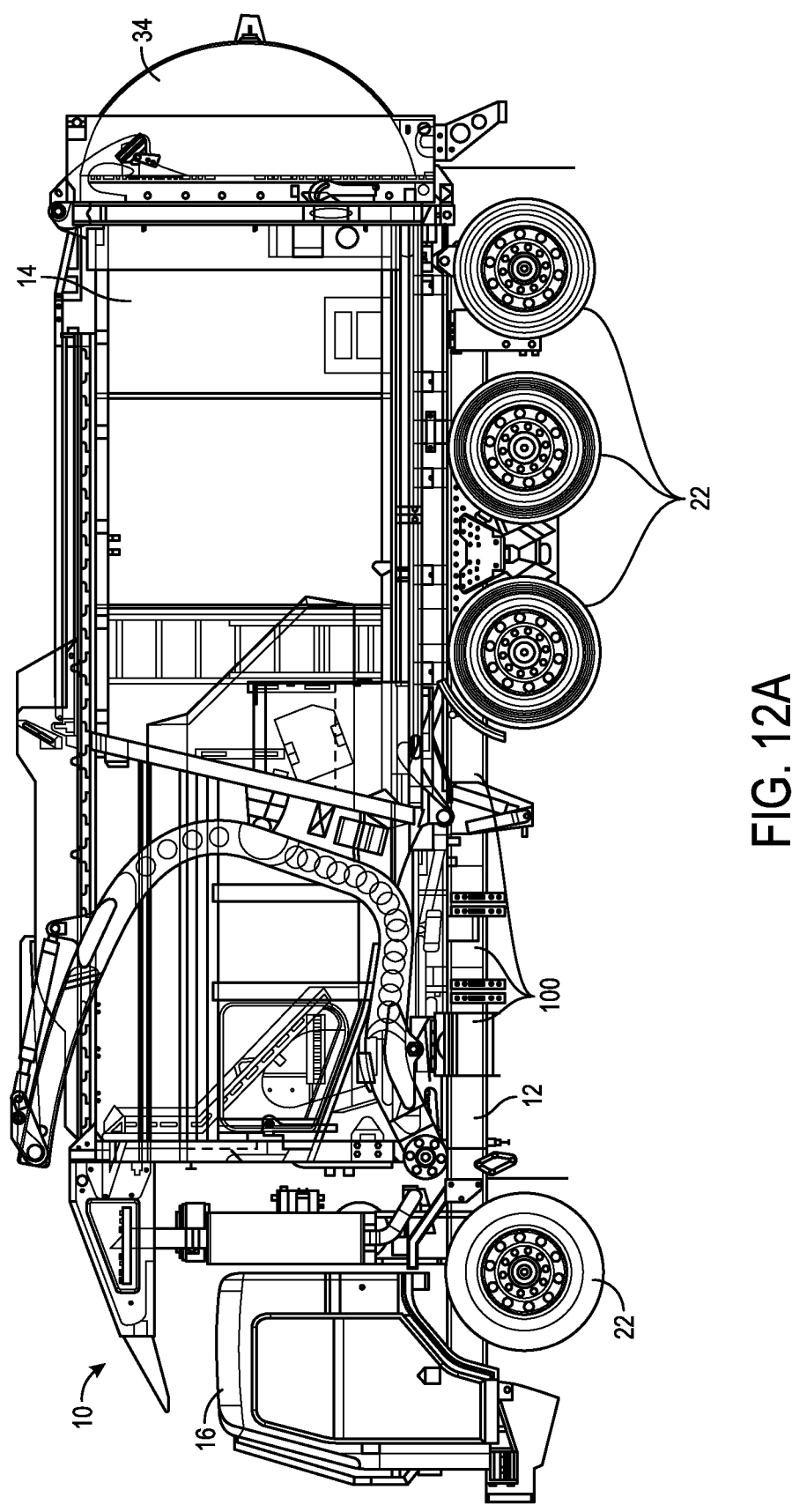
FIG. 12A is a side view of the refuse vehicle of FIG. 1 having batteries positioned between longitudinal body frame members above a chassis of the refuse vehicle, according to an exemplary embodiment.
Figure 12B:
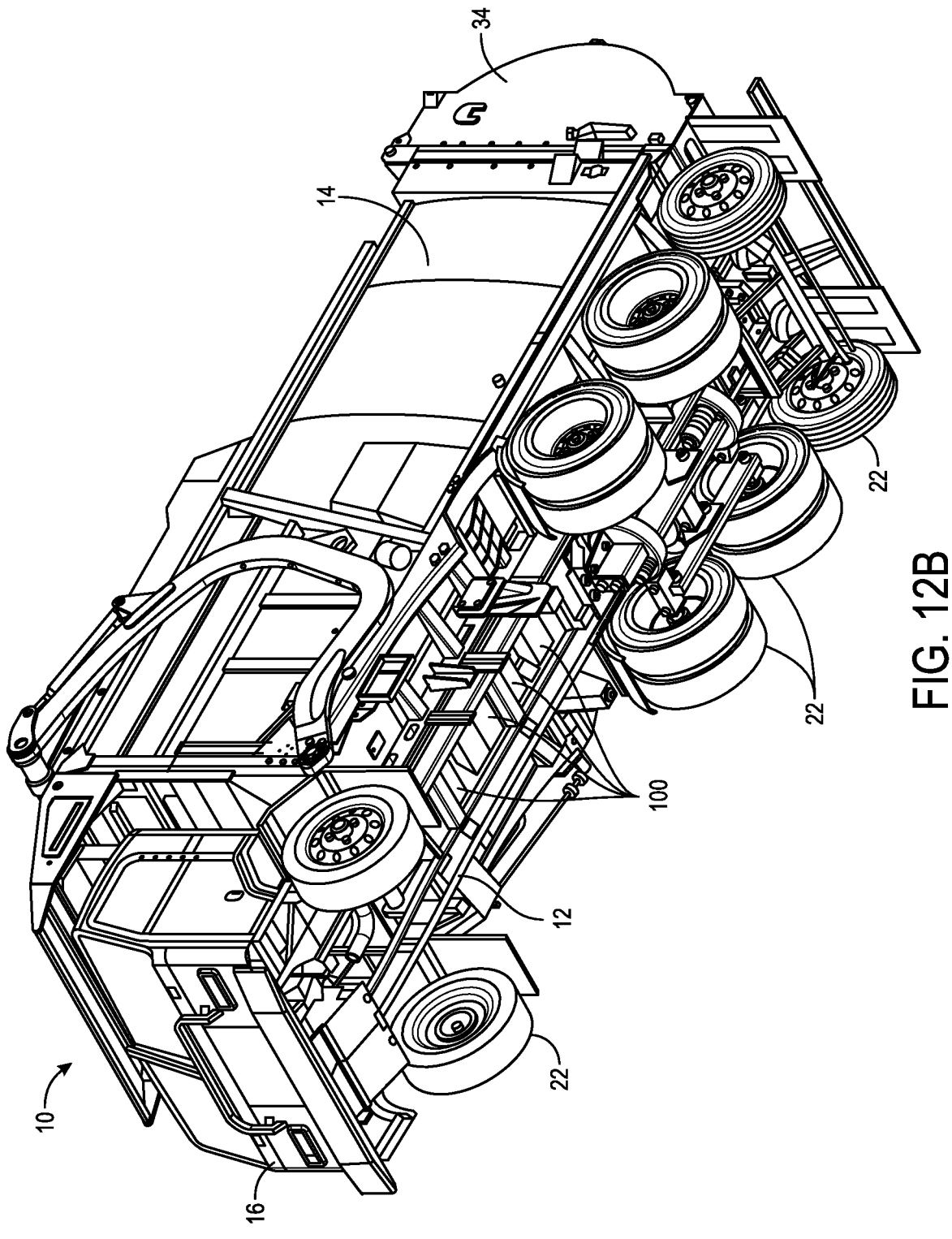
FIG. 12B is a perspective view of the refuse vehicle of FIG. 1 having batteries positioned between the longitudinal body frame members above the chassis of the refuse vehicle, according to an exemplary embodiment.
Figure 12C:
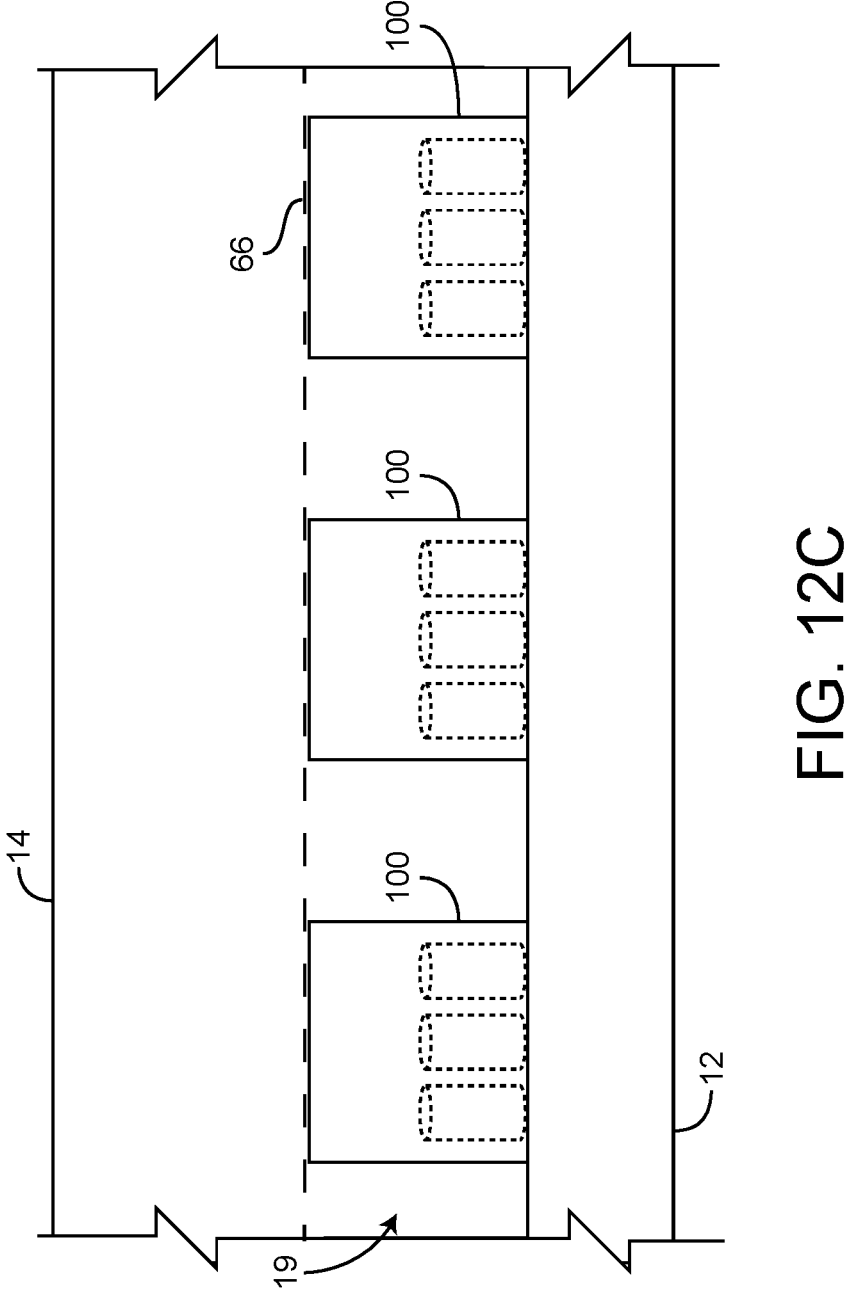
FIG. 12C is a diagram of a portion of the refuse vehicle of FIGS. 12A-12B with batteries positioned above the chassis beneath a floor surface of the body, according to an exemplary embodiment.

Referring particularly to FIGS. 12A-12C, the batteries 100 can be positioned between the frame 12 and the body 14 (e.g., in a floor of the body 14). In some embodiments, the body 14 and the frame 12 define a space 19 therebetween (e.g., between a floor surface 66 of the body 14 and a top surface or upper periphery of the frame 12). The batteries 100 can be positioned within the space 19 and spaced longitudinally along the frame 12 and the body 14 (e.g., as shown in FIG. 12C). In some embodiments, the batteries 100 are fastened to the body 14 and hang from an underside of the body 14. In some embodiments, the batteries 100 are coupled with the body 14 and/or the frame 12 similarly to as described in greater detail above with reference to FIGS. 11A-11D. In some embodiments, the batteries 100 hang from the underside of the body 14, or are positioned within a floor of the body 14. The batteries 100 can extend downwards and terminate at an upper surface of the frame 12, terminate above the upper surface of the frame 12, or extend into the space 17 between the frame members 13 and 15. In some embodiments, the batteries 100 are also coupled with the frame 12.

The batteries 100 can be positioned at least partially within the space 19 defined by the body 14 and the frame 12. In some embodiments, the batteries 100 extend upwards into a space 64 within the body 14 so that the batteries 100 are at least partially positioned within the space 64. For example, the batteries 100 can be positioned at a floor surface 66 of the body 14 and may extend at least partially downwards into the space 19 between the body 14 and the frame 12 (e.g., terminating within the space 19, terminating at a boundary of the space 19, etc.).

Figure 13A:
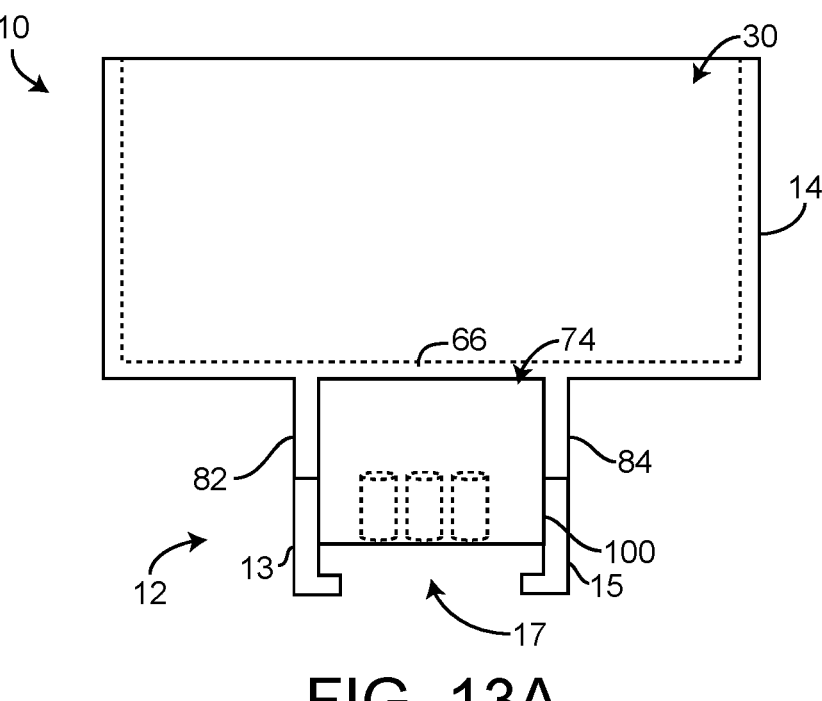
FIG. 13A is a diagram of a battery positioned between both chassis frame rails and body frame rails of a refuse vehicle, according to an exemplary embodiment.

Referring particularly to FIG. 13A, the body 14 may include a right frame member 82 and a left frame member 84 (e.g., a right body frame member and a left body frame member), according to an exemplary embodiment. The right frame member 82 and the left frame member 84 of the body 14 extend in a same direction as the frame 12. Specifically, the right frame member 82 and the left frame member 84 extend in the longitudinal direction along at least a portion of an entire longitudinal length of the body 14. The right frame member 82 and the left frame member 84 can be spaced apart a lateral distance that is equal to, greater than, or less than the lateral spacing of the right frame member 13 and the left frame member 15. The right frame member 13 and the left frame member 15 are chassis frame members, while the right frame member 82 and the left frame member 84 are body frame members. The right frame member 82 and the left frame member 84 can be continuous structural members that extend substantially an entire length of the body 14, or may be multiple discrete sections that extend along the entire length of the body 14. The right frame member 82 and the left frame member 84 can be configured to abut, rest upon, etc., the right frame member 13 and the left frame member 15, or may be configured to extend along lateral outer surfaces of the right frame member 13 and the left frame member 15, respectively, or may be configured to extend along lateral inwards surfaces of the right frame member 13 and the left frame member 15, respectively. In any of these configurations, the body 14 is fixedly coupled with the frame 12 through the frame members 82 and 84 and the frame members 13 and 15. The right frame member 82 and the left frame member 84 are rails, bars, beams, etc., and may have an I-shape, a rectangular shape, a T-shape, an L-shape, etc. The right frame member 82 and the left frame member 84 extend from an underside or bottom surface of the body 14, or may extend downwards from the floor surface 66 of the body 14 (e.g., the floor surface 66 of the refuse compartment 30).

As shown in FIG. 13A and described in greater detail above, the right frame member 13 and the left frame member 15 define the space 17 therebetween. The right frame member 82 and the left frame member 84 similarly define a space 74 therebetween. The batteries 100 can be positioned between the right frame member 13 and the left frame member 15, and also between the right frame member 82 and the left frame member 84. Specifically, the batteries 100 can be positioned within both the space 17 and the space 74.

The batteries 100 can be fixedly coupled with the right frame member 82 and the left frame member 84 of the body 14 (e.g., fastened), fixedly coupled with the right frame member 13 and the left frame member 15 of the frame 12 (e.g., fastened), hung from underside of the body 14 (e.g., from the floor surface 66), and may extend into the space 74, or the space 17. For example, in some embodiments, the batteries 100 hang from the floor surface 66 and extend into the space 74 and/or the space 17.

Figure 13B:
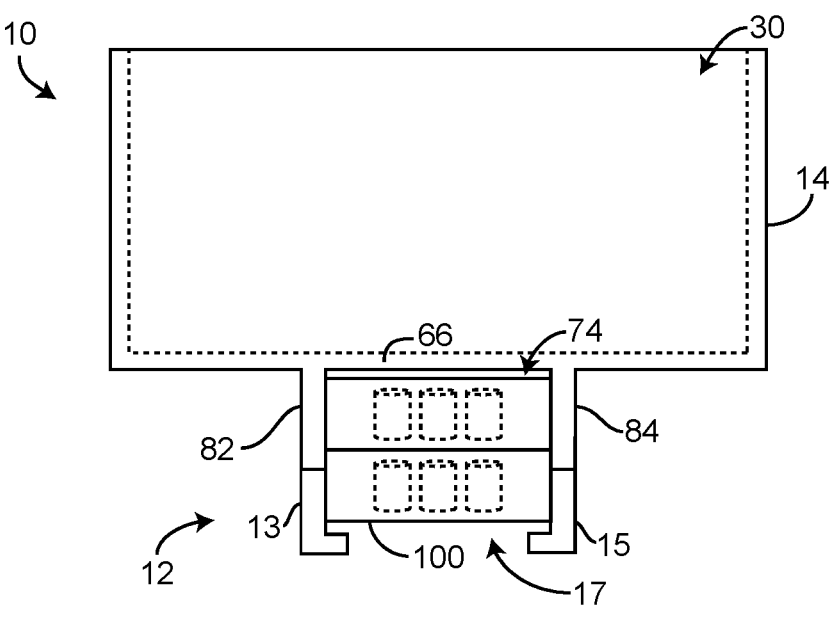
FIG. 13B is a diagram of stacked batteries positioned between both chassis frame rails and body frame rails of a refuse vehicle, according to an exemplary embodiment.

Referring now to FIG. 13B, the batteries 100 can also be stacked relative to each other (e.g., in a vertical direction as shown) and positioned within the spaces 17 and 72. As shown in FIG. 13B, the batteries 100 can be positioned within both the spaces 17 and 72, with one of the batteries 100 positioned at least partially within the space 17, and another of the batteries 100 positioned at least partially within the space 74. In other embodiments, the batteries 100 are stacked relative to each other in a lateral direction between the right frame member 13 and the left frame member 15, between the right frame member 82 and the left frame member 84, or between both the right frame member 13 and the left frame member 15 and the right frame member 82 and the left frame member 84.

Figure 13C:
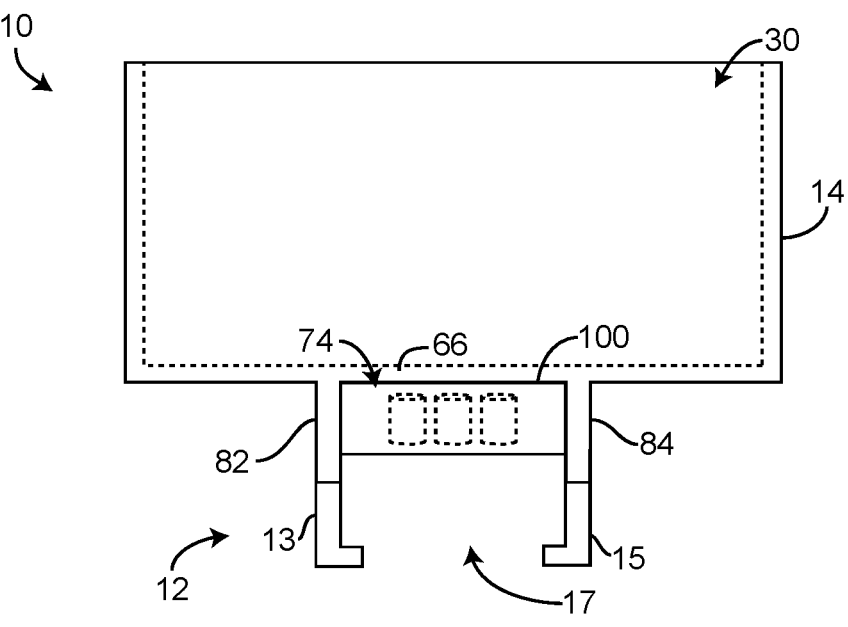
FIG. 13C is a diagram of a battery positioned between body frame rails of a refuse vehicle, above a chassis of the refuse vehicle, according to an exemplary embodiment.

Referring to FIG. 13C, the batteries 100 are positioned within the space 74 between the right frame member 82 and the left frame member 84, but not within the space 17 between the right frame member 82 and the left frame member 84, according to another embodiment. In this embodiment, the batteries 100 are positioned proximate the underside of the body 14 (e.g., beneath the surface 66) but above the frame 12. Advantageously, positioning the batteries 100 as shown in FIG. 13C facilitates a tighter configuration with the batteries 100 shielded from debris or objects as the refuse vehicle 10 travels, due to the relative positioning between the batteries 100 and the underside of the body 14, between the longitudinal frames 82 and 84 of the body 14. The batteries 100 can be coupled with the body 14 by hanging from the underside of the body 14, fixed coupling with the batteries 100 and the right and left frame members 82 and 84, or both. The batteries 100 can be coupled with the right and left frame members 82 and 84 similarly as the batteries 100 are coupled with the right and left frame members 13 and 15 as described in greater detail above with reference to FIGS. 11C-11D.

Figure 13D:
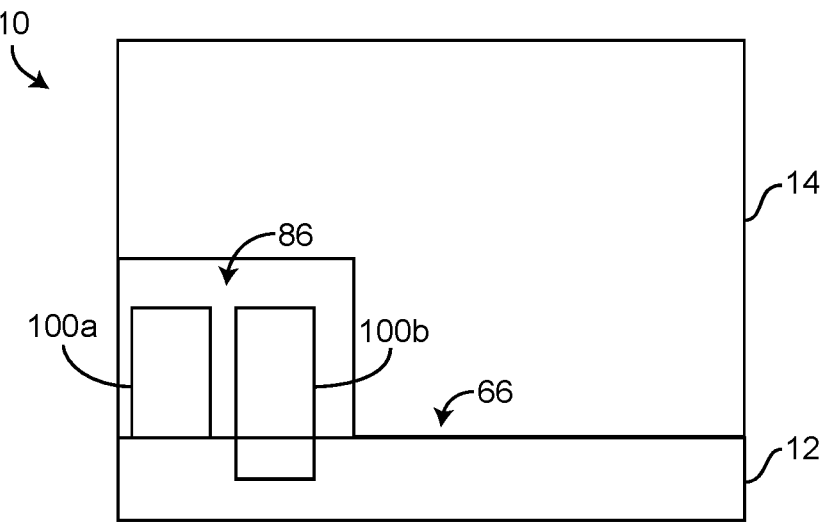
FIG. 13D is a diagram of a side view of a body and frame of a refuse vehicle, with batteries extending into a space of the body, according to an exemplary embodiment.

Referring to FIG. 13D, the batteries 100 are positioned at least partially, or entirely, within a space 86 of the body 14, according to various exemplary embodiments. The space 86 is a tunnel, recessed area, or offset area relative to the floor surface 66 of the body 14. In this way, when the batteries 100 are positioned at least partially or entirely within the space 86, the batteries 100 extend upwards into the space 86 of the body 14 above the floor surface 66 of the body 14. In any of the configurations where the batteries 100 extend at least partially into the space 86, the batteries 100 may rest atop a top surface of the frame 12 (e.g., the right and left frame members 13 and 15), may be coupled with the right frame member 82 and the left frame member 84 of the body 14, and/or may be coupled with the right and left frame members 13 and 15. In any of the configurations where the batteries 100 extend at least partially into the space 86 of the body 14, the batteries 100 can extend between the right frame member 82 and the left frame member 84, or may extend between both (i) the right frame member 82 and the left frame member 84 of the body 14, and (ii) the right frame member 13 and the left frame member 15 of the frame 12.

The space 86 may be a tunnel or void that extends in the longitudinal direction along the body 14. The space 86 can also extend in the lateral direction along a width of the body 14. For example, the space 86 may extend in the lateral direction a distance that is substantially equal to a lateral spacing of the right frame member 82 and the left frame member 84 of the body 14, or a distance that is greater than a lateral spacing of the right frame member 82 and the left frame member 84. The space 86 can be an area that a prime mover (e.g., electric motor 18) and a transmission of the refuse vehicle 10 are positioned. The space 86 can also accommodate positioning of one or more of the batteries 100 as described herein.

Figure 13E:
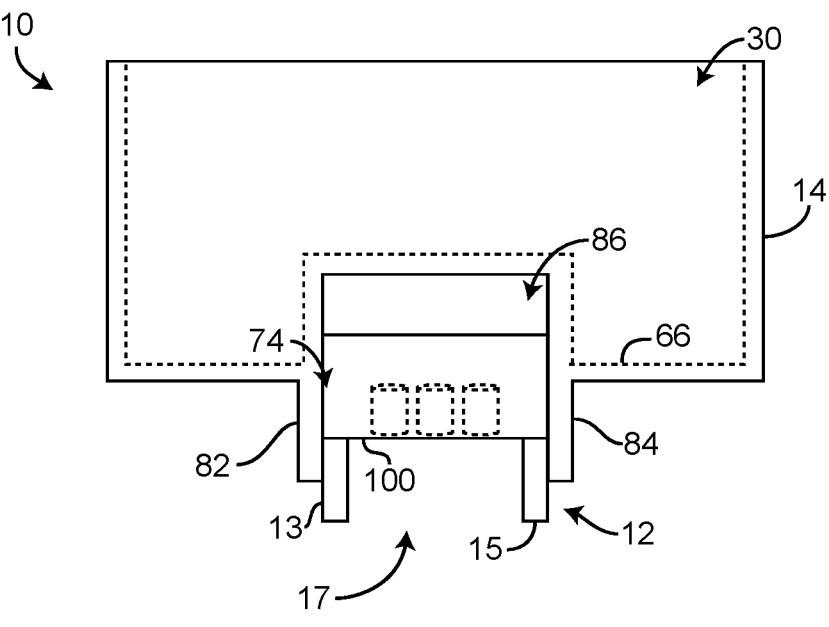
FIG. 13E is a diagram of a body and frame of a refuse vehicle, with batteries extending into a space of the body, according to an exemplary embodiment.

Referring particularly to FIG. 13E, the batteries 100 are shown extending into the space 86 of the body 14, while occupying space between the first frame member 82 and the second frame member 84 of the body 14, but not occupying space between the first frame member 13 and the second frame member 15 of the frame 12. Particularly, the batteries 100 can be stacked or rest on top of the right frame member 13 and the left frame member 15 of the frame 12, and extend upwards, past the floor surface 66 of the body 14, into the space 86 of the body 14. In some embodiments, the batteries 100 are fixedly coupled (e.g., fastened) with the right frame member 82 and the left frame member 84 of the body 14, and extend upwards into the space 86 of the body 14. In some embodiments, the right frame member 82 and the left frame member 84 of the body 14 rest upon a top surface of the right frame member 13 and the left frame member of the frame 12. The batteries 100 can be stacked on top of each other and at least partially extend into the space 86 of the body 14.

Figure 13F:
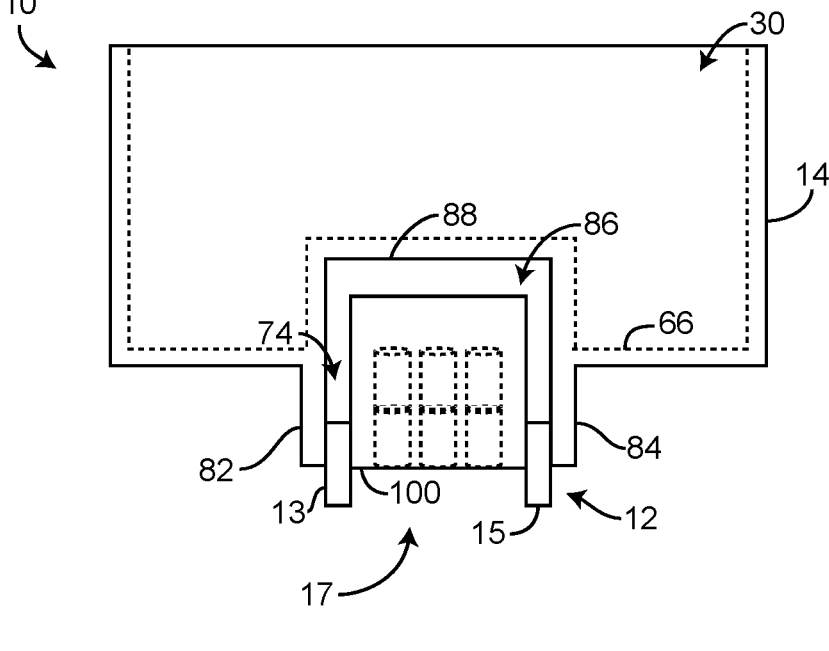
FIG. 13F is a diagram of a body and frame of a refuse vehicle, with batteries extending into a space of the body and between chassis frame rails of the refuse vehicle, according to an exemplary embodiment.

Referring particularly to FIG. 13F, the batteries 100 can be positioned to extend into the space 86, and to also extend into the space 17 between the first frame member 13 and the second frame member 15 of the frame 12. The batteries 100 can be fixedly coupled with the right frame member 13 and the left frame member 15 of the frame 12, and can be configured to extend through the space 74 defined between the right frame member 82 and the left frame member 84 of the body 14, and at least partially into the space 86. In some embodiments, the batteries 100 hang from an upper surface of the body 14 within the space 86 (e.g., the batteries 100 are hung from a surface 88 of the body 14) and extend into the space 86. The batteries 100, when hung from the surface 88 of the body 14 may also extend downwards, past the floor surface 66 into the space 74 between the right frame member 82 and the left frame member 84 of the body 14, and/or extend past the right frame member 82 and the left frame member 84 of the body 14, at least partially into the space 17 between the right frame member 13 and the left frame member of the frame 12.

Advantageously, positioning the batteries 100 between the frame 12 and the body 14 (as shown in FIGS. 12A-12C) or between the right frame member 13 and the left frame member 15 (as shown in FIGS. 11A-11D) facilitates a robust and compact packaging and placement of the batteries 100. Further, positioning the batteries 100 as shown in FIGS. 11A-11D or 12A-12C facilitates a lower center of gravity of the refuse vehicle 10, thereby reducing a likelihood of rollover and improving ride stability. In some embodiments, the batteries 100 are configured to store and provide electrical energy for usage on the refuse vehicle 10 (e.g., for use by the electric motor 18 to facilitate transportation of the refuse vehicle 10 or any other electric motor of the refuse vehicle 10). For example, the batteries 100 can be configured to provide electrical energy for one or more chassis operations or body operations (e.g., to operate a lift assembly of the refuse vehicle 10). In some embodiments, the batteries 100 facilitate a fully or semi electric refuse vehicle.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An electrified vehicle comprising:
   a chassis including a right frame member and a left frame member, each of the right frame member and the left frame member having a vertical portion, a first end portion extending from a first end of the vertical portion, and a second end portion extending from an opposing second end of the vertical portion, the right frame member and the left frame member configured to support a cab and a body, the right frame member and the left frame member extending lengthwise in a longitudinal direction; and
   a plurality of battery cells positioned along the chassis between the right frame member and the left frame member, wherein the plurality of battery cells are supported by at least one of the right frame member or the left frame member via couplings positioned along the vertical portion of the at least one of the right frame member or the left frame member.

2. The electrified vehicle of claim 1, wherein a lower periphery of the right frame member and the left frame member, an upper periphery of the right frame member and the left frame member, and inwards facing surfaces of the right frame member and the left frame member define a space within which the plurality of battery cells are positioned.

3. The electrified vehicle of claim 1, wherein the plurality of battery cells are positioned to be located below an underside of the body.

4. The electrified vehicle of claim 1, wherein the plurality of battery cells are disposed within one or more housings, each of the one or more housings supported by the at least one of the right frame member or the left frame member.

5. The electrified vehicle of claim 4, wherein an uppermost periphery of the one or more housings is spaced a distance below a point at which the body contacts a top surface of the chassis.

6. The electrified vehicle of claim 4, wherein a lowermost periphery of the one or more housings extends below the chassis.

7. The electrified vehicle of claim 1, further comprising a front axle coupled to the chassis and a rear axle coupled to the chassis, wherein the plurality of battery cells are positioned forward of the rear axle.

8. The electrified vehicle of claim 7, wherein the plurality of battery cells are a first plurality of battery cells, further comprising a second plurality of battery cells positioned rearward of the rear axle.

9. The electrified vehicle of claim 1, wherein the plurality of battery cells are a first plurality of battery cells, further comprising a second plurality of battery cells centered along a longitudinal axis defined by the chassis.

10. An electrified vehicle comprising:
    a chassis defining a longitudinal axis, the chassis including:
       a right frame member; and
       a left frame member spaced from the right frame member;
       wherein the right frame member and the left frame member each have a vertical portion and flanges at opposite ends of the vertical portion;
    an electric motor coupled to the chassis; and
    a battery pack electrically coupled to the electric motor;

wherein the battery pack is supported by the chassis with one or more couplings that (a) are positioned along the right frame member and the left frame member and (b) engage with the right frame member and the left frame member vertically between the opposite ends of the vertical portion thereof; and wherein the battery pack is centered along the longitudinal axis.

11. The electrified vehicle of claim 10, further comprising a rear axle, wherein the battery pack is positioned rearward of the rear axle.

12. The electrified vehicle of claim 10, wherein the battery pack is a first battery pack, further comprising a second battery pack and a third battery pack positioned on opposing sides of the longitudinal axis.

13. The electrified vehicle of claim 12, wherein a lowermost periphery of the second battery pack and the third battery pack extends below the chassis.

14. The electrified vehicle of claim 10, further comprising a generator coupled to the chassis, the generator configured to charge the battery pack.

15. The electrified vehicle of claim 10, further comprising a fluid system, wherein the electric motor is powered by the battery pack to drive the fluid system.

* * * * *